(12) United States Patent
Dudar et al.

(10) Patent No.: US 11,120,434 B2
(45) Date of Patent: Sep. 14, 2021

(54) SYSTEM AND METHOD FOR SECURING TRANSACTION IN A BLOCKCHAIN NETWORK

(71) Applicant: AnApp Technologies Limited, Hong Kong (CN)

(72) Inventors: Marcin Wojciech Dudar, Hong Kong (CN); Peter On Bon Chan, Hong Kong (CN); Frederick Kwok Yin Leung, Hong Kong (CN)

(73) Assignee: AnApp Technologies Limited, Hong Kong (CN)

( * ) Notice: Subject to any disclaimer, the term of this patent is extended or adjusted under 35 U.S.C. 154(b) by 417 days.

(21) Appl. No.: 16/278,417

(22) Filed: Feb. 18, 2019

(65) Prior Publication Data

US 2019/0378127 A1    Dec. 12, 2019

Related U.S. Application Data

(60) Provisional application No. 62/682,336, filed on Jun. 8, 2018.

(51) Int. Cl.
*H04L 29/06* (2006.01)
*G06Q 20/38* (2012.01)
(Continued)

(52) U.S. Cl.
CPC ......... *G06Q 20/3825* (2013.01); *H04L 9/006* (2013.01); *H04L 9/0637* (2013.01);
(Continued)

(58) Field of Classification Search
CPC .. G06Q 20/3825; G06Q 20/06; G06Q 20/382; G06Q 20/401; G06Q 2220/00;
(Continued)

(56) References Cited

U.S. PATENT DOCUMENTS 10,756,904 B1 *  8/2020  Perlman ............... G06F 21/64
10,805,067 B1 * 10/2020  Griffin ................ H04L 9/0643
(Continued)

*Primary Examiner* — Malcolm Cribbs
(74) *Attorney, Agent, or Firm* — Leydig, Voit & Mayer Ltd.; John Augustyn

(57) ABSTRACT

A method for securing transaction in a blockchain network and a related system with a blockchain network. The blockchain network has information handling devices operably connected with each other. The information handling devices collectively maintain a blockchain ledger containing one or more transaction blocks with transaction information. The method includes validating a new transaction request to be added to the blockchain ledger. The validation includes digitally signing, at two or more of the information handling devices in the blockchain network, respectively, an interim block associated with the new transaction request, using a HASH value of the interim block and respective private keys of the two or more of the information handling devices. The method also includes verifying the one or more signed interim blocks for determining whether to add to the blockchain ledger a new transaction block containing the validated new transaction request and the at least two digital signatures.

33 Claims, 18 Drawing Sheets

(51) Int. Cl.
*H04L 9/32* (2006.01)
*H04L 9/00* (2006.01)
*H04L 9/06* (2006.01)

(52) U.S. Cl.
CPC .......... *H04L 9/3236* (2013.01); *H04L 9/3247* (2013.01); *H04L 2209/38* (2013.01); *H04L 2209/56* (2013.01)

(58) Field of Classification Search
CPC ...... G06Q 20/381; G06Q 40/04; H04L 9/006; H04L 9/0637; H04L 9/3236; H04L 9/3247; H04L 2209/38; H04L 2209/56; H04L 9/0643; H04L 9/30; H04L 9/0618; G06F 21/62; G06F 21/6209; G06F 21/6218; G06F 21/6227; G06F 16/1824; G06F 21/44; G06F 21/629; G06K 2009/00583
See application file for complete search history.

(56) References Cited

U.S. PATENT DOCUMENTS

| | | | |
|---|---|---|---|
| 2019/0065685 A1* | 2/2019 | Pickover | H04L 9/3297 |
| 2019/0236562 A1* | 8/2019 | Padmanabhan | G06Q 20/40 |
| 2019/0238340 A1* | 8/2019 | Wang | G06F 16/1824 |
| 2019/0238525 A1* | 8/2019 | Padmanabhan | H04L 63/101 |
| 2019/0282906 A1* | 9/2019 | Yong | G06Q 20/3827 |
| 2019/0379543 A1* | 12/2019 | Sethi | H04L 9/3239 |
| 2021/0135854 A1* | 5/2021 | Karame | H04L 9/06 |

* cited by examiner

SYSTEM AND METHOD FOR SECURING TRANSACTION IN A BLOCKCHAIN NETWORK

RELATED APPLICATION

This application claims the priority of U.S. provisional Patent Application No. 62/682,336, filed on 8 Jun. 2018, and which is incorporated herein by reference.

TECHNICAL FIELD

The invention relates to systems and methods for securing transaction in a blockchain network.

BACKGROUND

Blockchain network generally includes multiple, distributed information handling devices (e.g. computers; also called "ledger servers") operably connected with each other and collectively maintaining a blockchain ledger that has one or more transaction blocks containing transaction information. Each of the information handling devices in the blockchain network can be called a "node".

Typical blockchain transaction blocks are secured with computed HASH by the nodes in the blockchain. It relies on security of each of the nodes holding the ledger to verify the integrity of the blockchain.

In a blockchain network with large number of ledger servers, the security problem is less prominent because it would be extremely difficult, if not impossible, to simultaneously attack more than half of such distributed ledger servers (such attack is known as "51% attack" on a blockchain, or "hostile takeover"). However, in a blockchain network with small number of ledger servers, e.g., during the build-up stage of a blockchain network, the risk of hostile takeover increases substantially.

SUMMARY OF THE INVENTION

It is an object of the invention to overcome or substantially ameliorate the above problems associated with hostile takeover, or more generally, to provide systems and methods for improving security of transaction in a blockchain network.

In accordance with a first aspect of the invention, there is provided a method for securing transaction in a blockchain network, the blockchain network including a plurality of information handling devices operably connected with each other, the plurality of information handling devices collectively maintaining a blockchain ledger containing one or more transaction blocks with transaction information, the method comprising: validating a new transaction request to be added to the blockchain ledger, the validation including digitally signing, at two or more of the information handling devices in the blockchain network, respectively, an interim block associated with the new transaction request using a HASH value of the interim block and respective private keys of the two or more of the information handling devices; and verifying the one or more signed interim blocks for determining, whether to add to the blockchain ledger, a new transaction block containing the validated new transaction request and the at least two digital signatures. The digital signature can be generated using Digital Signature Algorithm (DAS), Elliptic Curve DSA (ECDSA), etc.

Preferably, the method further includes adding, to the blockchain ledger in each of the plurality of information handling devices, the new transaction block containing the validated new transaction request and the at least two digital signatures upon successful verification of the one or more signed interim blocks.

Preferably, the validation further comprises, prior to signing: generating, at one or more of the information handling devices in the blockchain network, an interim block with a HASH value using a hashing algorithm as directed by the "blockchain system" (provided by the blockchain network), which may be stored in one or more information handling device, singly or distributively, and based on data of the new transaction request and the last HASH value in the blockchain ledger.

Preferably, the one or more information handling devices that generates the interim block with the HASH value is further arranged to digitally sign the interim block.

Preferably, the one or more information handling devices that generates the interim block with the HASH value is arranged to transmit the interim block to other information handling devices in the blockchain network for digital signing.

In one embodiment, the two or more of the information handling devices that perform the digital signing includes a first information handling device and a second information handling device, and wherein digital signing at the two or more of the information handling devices is performed at least partly in parallel such that the digital signing comprises: generating, at the first information handling device, from the interim block associated with the new transaction request, a first signed interim block with a digital signature of the first information handling device; and generating, at the second information handling device, from the interim block associated with the new transaction request, a second signed interim block with a digital signature of the second information handling device. In one embodiment, the method may further include consolidating the first and second signed interim blocks to form a single signed block with all of the respective digital signatures. The consolidation may include identifying common data present in both the first and second signed interim blocks and forming the single signed block without duplicating the common data. The consolidation may be performed prior to the verification or after the verification. Preferably, the consolidation is performed in at least one of the information handling device that may have performed the digital signing.

In another embodiment, the two or more of the information handling devices in the blockchain network includes a first information handling device and a second information handling device, and the digital signing at the two or more of the information handling devices is performed at least partly in series such that the digital signing comprises: generating, at the first information handling device, from the interim block associated with the new transaction request, a first signed interim block with a digital signature of the first information handling device; and generating, at the second information handling device, from the first signed interim block, a second signed interim block with a digital signature of the second information handling device Preferably, the verification is performed by predetermined number of information handling devices in the blockchain network. More preferably, the verification is performed by predetermined (specific) information handling devices in the blockchain network. In one embodiment, the verification is performed by all information handling devices in the blockchain network other than the information handling devices that has performed the digital signing.

Preferably, the method further includes selecting information handling devices in the blockchain network to perform validation or verification, and wherein the validation or verification is performed by the selected information handling devices in the blockchain network. The selection may be based on the new transaction request. For example, the number of information handling devices selected in the selection step is based on a value or importance of the new transaction request.

In one embodiment, the verification is successful if more than half of the information handling devices that perform the verification have determined all of the two or more digital signatures to be valid. In another embodiment, the verification is successful if a predetermined number of information handling devices that perform the verification have determined all of the two or more digital signatures to be valid.

Preferably, the verification comprises: generating a checking HASH using a digital signature in the signed interim block and a public key of the information handling device that digitally signed the corresponding digital signature; comparing the checking HASH with a HASH value in the signed interim block; determining that the signature is valid if the checking HASH does not match the HASH value in the signed interim block; and determining that the signature is invalid if the checking HASH matches the HASH value in the signed interim block.

Preferably, the plurality of information handling devices are IoT devices such as but not limited to electrical domestic appliances, consumer electronics, and wearable and portable electrical devices.

In accordance with a second aspect of the invention, there is provided a system for securing transaction in a blockchain network, comprising: a blockchain network having a plurality of information handling devices operably connected with each other and collectively maintaining a blockchain ledger containing one or more transaction blocks with transaction information; the plurality of information handling devices each including a processor. Two or more of the information handling devices are operated as signing devices arrange to digitally sign, respectively, an interim block associated with the new transaction request using a HASH value of the interim block and the respective private key of the information handling device so as to validate a new transaction request to be added to the blockchain ledger. One or more (e.g., a selected number or all) of the information handling devices are operated as verification devices arranged to verify the one or more signed interim blocks for determining, whether to add to the blockchain ledger, a new transaction block containing the validated new transaction request and the at least two digital signatures. The digital signature can be generated using Digital Signature Algorithm (DAS), Elliptic Curve DSA (ECDSA), etc.

Preferably, the plurality of information handling devices are arranged to add, to the blockchain ledger, the new transaction block containing the validated new transaction request and the at least two digital signatures upon successful verification of the one or more signed interim blocks by the verification devices.

Preferably, one or more of the information handling devices is operated as a generation device arranged to generate, prior to signing, an interim block with a HASH value using a hashing algorithm as directed by the "blockchain system", which may be stored in one or more information handling device, singly or distributively, and based on data of the new transaction request and the last HASH value in the blockchain ledger. The generation device may be further operated as the signing device.

Preferably, the blockchain system is arranged to transmit the interim block to the signing devices in the blockchain network for signing.

Preferably, the signing devices includes a first information handling device and a second information handling device arranged to digitally sign at least partly in parallel such that: the first information handling device is arranged to generate, from the interim block associated with the new transaction request, a first signed interim block with a digital signature of the first information handling device; and the second information handling device is arranged to generate, from the interim block associated with the new transaction request, a second signed interim block with a digital signature of the second information handling device. One or more of the information handling devices may be operated as a consolidation device arranged to consolidate the first and second signed interim blocks to form a single signed block with all of the respective digital signatures. The consolidation device may be arranged to identify common data present in both the first and second signed interim block and form the single signed block without duplicating the common data. In one embodiment, the consolidation device is arranged to provide the single signed block to the verification devices for verification. Alternatively, the consolidation device is arranged to consolidate the first and second signed interim blocks that have been verified. In one embodiment, the consolidation device is further operated as the signing device.

Preferably, the signing devices includes a first information handling device and a second information handling device arranged to digitally sign at least partly in series such that: the first information handling device is arranged to generate, from the interim block associated with the new transaction request, a first signed interim block with a digital signature of the first information handling device; and the second information handling device is arranged to generate, from the first signed interim block, a second signed interim block with a digital signature of the second information handling device.

Preferably, the number of verification devices is predetermined. More preferably, the verification devices are predetermined. In one example, all information handling devices in the blockchain network other than the information handling devices that has performed the digital signing is operated as the verification devices.

Preferably, the verification device is arranged to perform verification by generating a checking HASH using a digital signature in the signed interim block and a public key of the information handling device that digitally signed the corresponding digital signature; comparing the checking HASH with a HASH value in the signed interim block; determining that the signature is valid if the checking HASH does not match the HASH value in the signed interim block; and determining that the signature is invalid if the checking HASH matches the HASH value in the signed interim block.

Preferably, the plurality of information handling devices are IoT devices such as but not limited to electrical domestic appliances, consumer electronics, and wearable and portable electrical devices.

In accordance with a second aspect of the invention, there is provided an information handling device of a blockchain network, the blockchain network including a plurality of information handling devices operably connected with each other, the plurality of information handling devices collectively maintaining a blockchain ledger containing one or more transaction blocks with transaction information, the information handling device comprises a processor and a memory storing the blockchain ledger and a private key of a private-public key pair, the information handling device is arranged to selectively: digitally sign an interim block associated with the new transaction request using a HASH value of the interim block and the stored private key; and verify a signed interim block signed by another information handling device, for determining, whether to add to the blockchain ledger, a new transaction block containing the validated new transaction request and the at least two digital signatures. In a preferred embodiment, if the information handling device performs signing then it would not perform verification, and vice versa.

Preferably, the information handling device is further arranged to add, to the blockchain ledger in the memory, the new transaction block containing the validated new transaction request and the at least two digital signatures upon successful verification of the signed interim blocks by the blockchain network.

Preferably, the information handling device is further arranged to generate, prior to signing, an interim block with a HASH value using a hashing algorithm stored in the memory of the information handling device and based on data of the new transaction request and the last HASH value in the blockchain ledger.

Preferably, the information handling device is further arranged to transmit the interim block to other information handling devices in the blockchain network for digital signing.

Preferably, the information handling device is further arranged to consolidate multiple signed interim blocks each with a respective digital signature to form a single signed block with all of the respective digital signatures.

Preferably, the information handling device is an IoT device such as but not limited to electrical domestic appliance, consumer electronic, and wearable and portable electrical device.

In accordance with a fourth aspect of the invention, there is provided a block for a blockchain, the block including: transaction information, a HASH value associated with the transaction information, and two or more digital signatures provided by two or more information handling devices in the blockchain network.

In accordance with a fifth aspect of the invention, there is provided a blockchain comprising the block of the fourth aspect.

In accordance with a sixth aspect of the invention, there is provided an information handling device comprising a processor and a memory configured to store the block of the fourth aspect or the blockchain of the fifth aspect.

In accordance with a seventh aspect of the invention, there is provided a blockchain network with one or more information handling device of the fifth aspect.

In accordance with an eighth aspect of the invention, there is provided a non-transitory computer readable medium storing the block of the fourth aspect or the blockchain of the fifth aspect. The non-transitory computer readable medium is arranged to store computer instructions that, when executed by one or more processors, causes the one or more processors to process the stored block or blockchain.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

Figure 1:
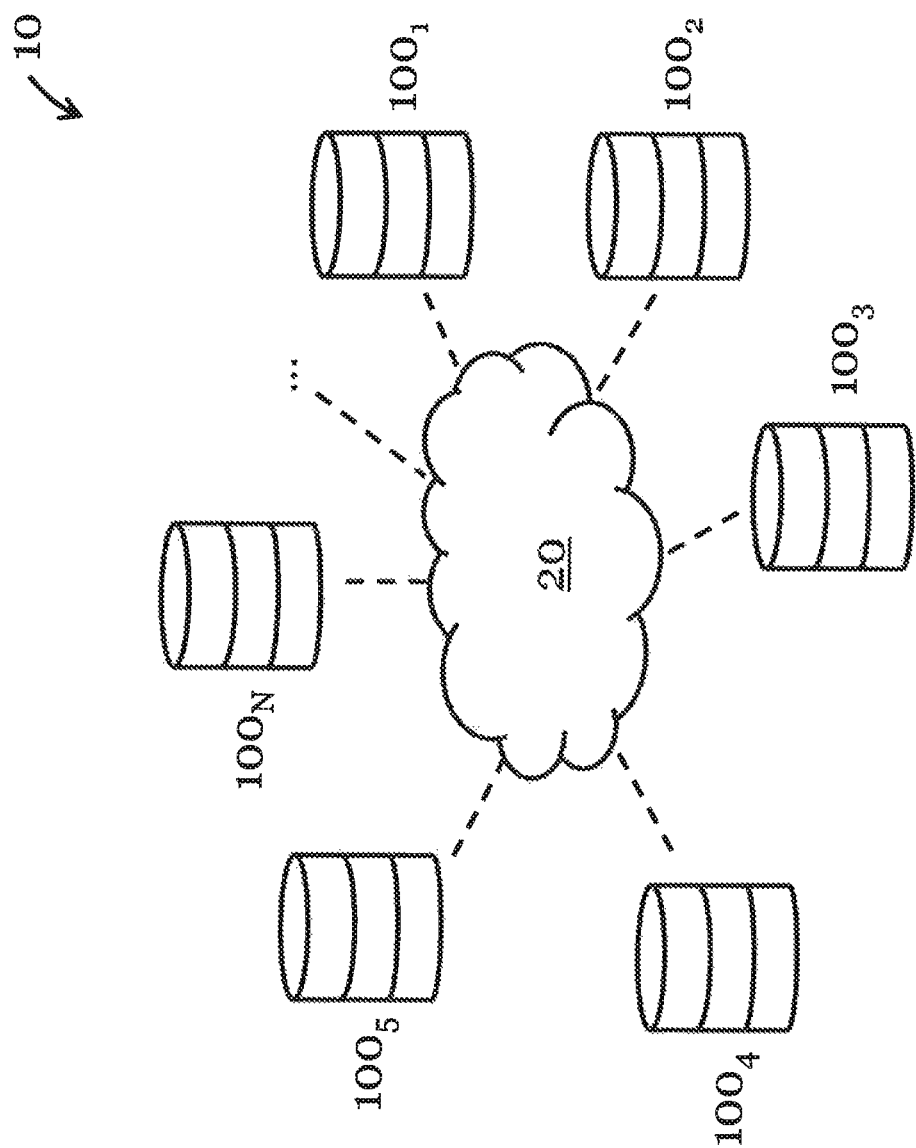
FIG. 1 is a schematic diagram of a blockchain network in one embodiment of the invention.

Referring to FIG. 1, a blockchain network 10 in one embodiment of the invention includes multiple information handling devices $100_1$-$100_N$ operably connected with each other through a peer-to-peer mesh network 20. The information handling devices $100_1$-$100_N$ are collectively maintaining a blockchain ledger containing one or more transaction blocks with transaction information. In other words, each of the information handling devices $100_1$-$100_N$ independently maintains a copy of the blockchain ledger.

Figure 2:
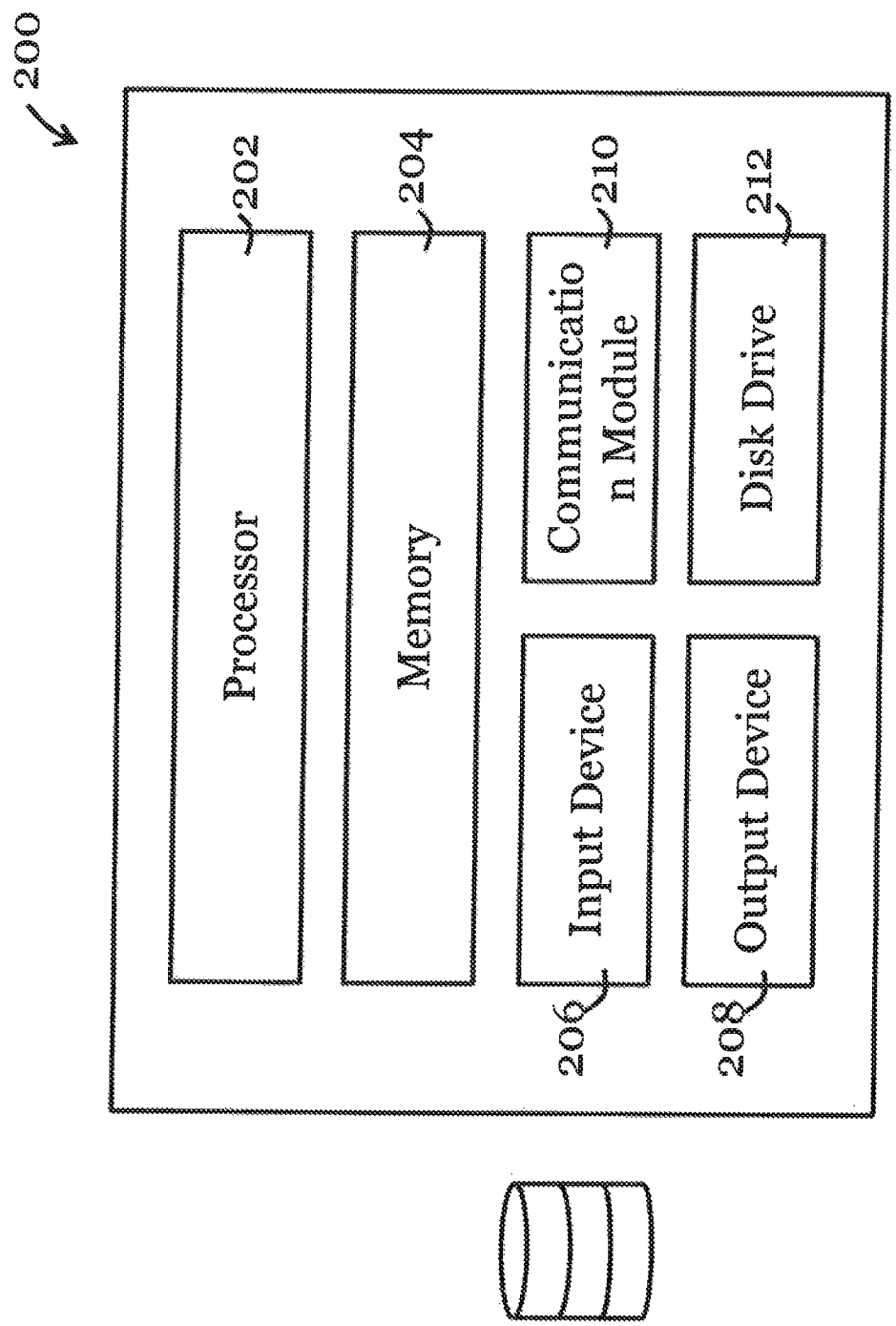
FIG. 2 is a block diagram of the main components of the information handling device in the blockchain network of FIG. 1.

FIG. 2 is a schematic diagram of an exemplary information handling device 200 that can be used as a ledger server in a blockchain network; including the information handling device $100_1$-$100_N$ of the blockchain network 10 in FIG. 1. The information handling device 200 may be embodied as an IoT device, a computer (e.g., desktop, laptop, tablet), a smart phone, a smart watch, an electrical domestic appliance, consumer electronic device, wearable electrical device, and portable electrical device, or the like. The information handling device 200 may have different configurations, and it generally comprises suitable components necessary to receive, store, and execute appropriate computer instructions, commands, or codes. The main components of the information handling device 200 are a processor 202 and a memory unit 204. The processor 202 may be formed by one or more CPU, MCU, controllers, logic circuits, Raspberry Pi chip, etc. The processor 202 is operable to perform the methods of the invention. The memory unit 204 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. The memory unit 204 may store computer instructions to be executed by the processor 202, and may store a blockchain ledger containing one or more transaction blocks with transaction information.

Preferably, the information handling device 200 further includes one or more input devices 206 such as a keyboard, a mouse, a stylus, an image scanner, a microphone, a tactile input device (e.g., touch sensitive screen), and an image/video input device (e.g., camera). The information handling device 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling device 200 may further include one or more disk drives 212 which may encompass solid state drives, hard disk drives, optical drives, flash drives, and/or magnetic tape drives. A suitable operating system may be installed in the information handling device 200, e.g., on the disk drive 212 or in the memory unit 204. The memory unit 204 and the disk drive 212 may be operated by the processor 202. The information handling device 200 also includes a communication module 210 for establishing one or more communication links (not shown) with all other information handling devices in the network 10 and optionally with one or more other computing devices such as servers, personal computers, terminals, tablets, phones, or other wireless or handheld computing devices. The communication module 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, the communication module 210, and optionally the input devices 206, the output devices 208, and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling device 200 shown in FIG. 2 is merely exemplary and different information handling devices 200 with different configurations may be applicable as the information handling device $100_1$-$100_N$ of the blockchain network 10 in FIG. 1.

Figure 3:
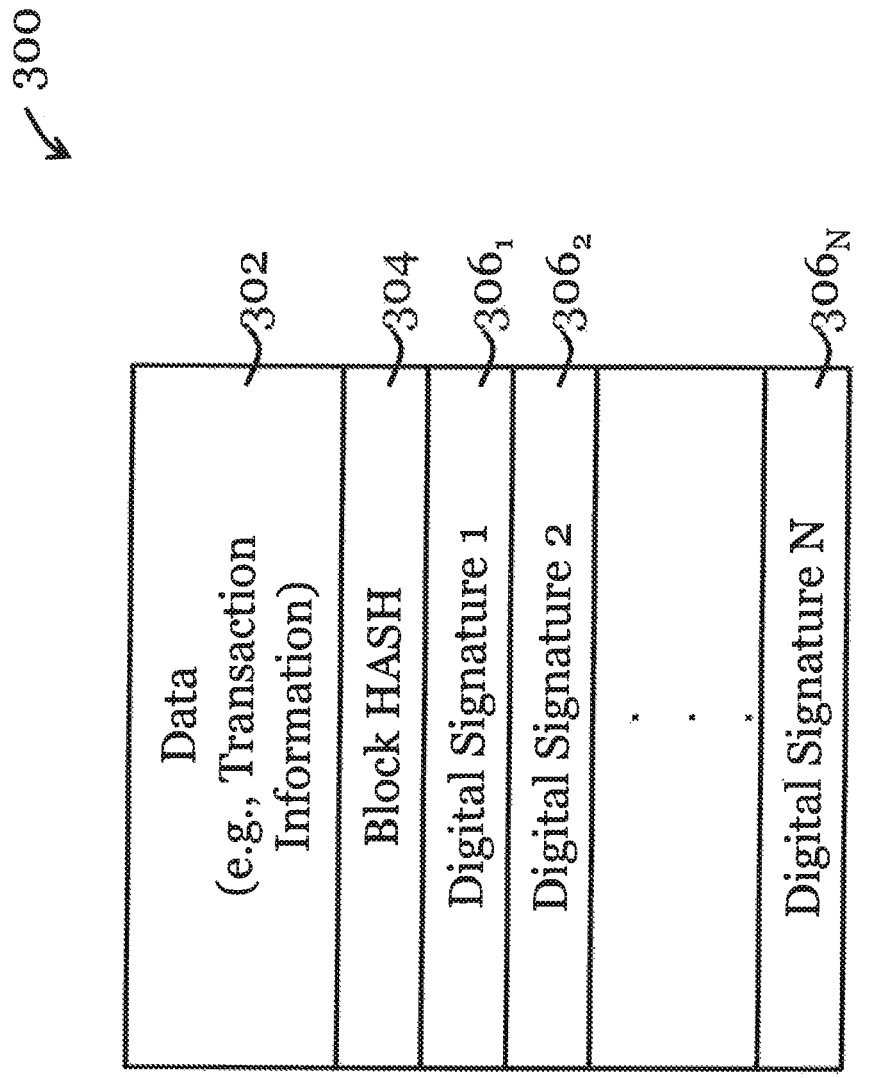
FIG. 3 is schematic diagram of a block structure for a blockchain in one embodiment of the invention.

FIG. 3 is the structure of a block 300 for a blockchain in one embodiment of the invention. In this embodiment, the block 300 is a block of the blockchain network 10 of FIG. 1. As shown in FIG. 3, the block 300 includes data 302 with transaction information (e.g., information of validated and verified transactions of current block), a HASH value 304 associated with the data 302, and multiple digital signatures $306_1$-$306_N$ provided by multiple information handling devices in the network 10. The number of digital signatures (N) is larger than or equal to two. The information handling devices $100_1$-$100_N$ that have provided the digital signatures can be referred to as the "witnessing nodes" and information handling devices that had generated block HASH can be referred to as "mining nodes". The main difference between the block structure 300 in FIG. 3 and conventional blockchain block structure is that the block structure 300 has two or more digital signatures $306_1$-$306_N$ while conventional block structure has no or only one single digital signature.

Figure 4:
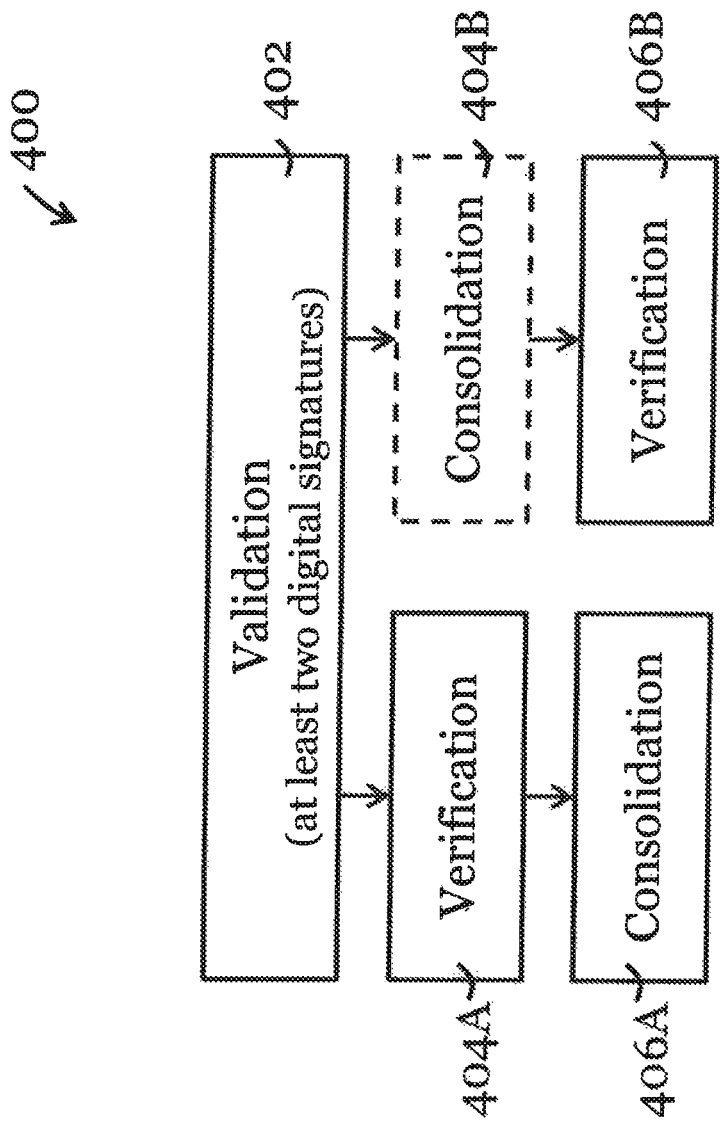
FIG. 4 is a high-level flow diagram of a general method for securing transaction in blockchain network in one embodiment of the invention.

FIG. 4 illustrates, in high-level, a method for securing transaction in blockchain network in one embodiment of the invention. In this embodiment, the method 400 is applied in the blockchain network 10 of FIG. 1 to secure transaction in the network 10. The method 400 is applied to generate a block structure for a new transaction request to be added to the blockchain ledger in the blockchain network.

The method begins in step 402 with validation of a new transaction request to be added to the blockchain ledger in the blockchain network. Generally, the validation includes digitally signing, at multiple information handling devices in the blockchain network, respectively, an interim block associated with the new transaction request. The signing by the information handling devices may be in parallel, in which each of the device sign the same interim block to create multiple signed interim blocks, or in series, in which one device sign after the other with the respective digital signatures aggregated in the same interim block. Details and embodiments of the validating process are described below.

After validation in step 402, the method 400 may then proceed to verification in step 404A and then explicit consolidation in step 406A. In step 404A, the method verifies the signed interim blocks resulting from the validation step 402 for determining whether to add to the blockchain ledger a new transaction block containing the new transaction request and the digital signatures. Upon successful verification in step 404A, the multiple verified signed blocks are consolidated into one single block in step 406A. Preferably, the single block has a structure of the block 300 in FIG. 3. Duplicated data from various verified signed blocks are preferably consolidated so that the resulting consolidated block has no or limited redundancy. Details and embodiments of the verification process and the explicit consolidation process are described below. After step 406A, the blockchain ledger in all information handling devices in the blockchain network can be updated with the consolidated, verified, and validated block representative of the new transaction request.

Alternatively, after validation in step 402, the method 400 may first proceed to an optional or implicit consolidation step 404B then to verification in step 406B. The consolidation step 404B is considered optional or implicit because it may be embodied in the validation step 402, when the information handling devices in the blockchain network perform signing in series, in which case only one single interim block with multiple signatures is generated. Details and embodiments of the verification process and the implicit consolidation process are described below. After step 406B, the blockchain ledger can be updated with the verified, implicitly consolidated, and validated block representative of the new transaction request.

Figure 5:
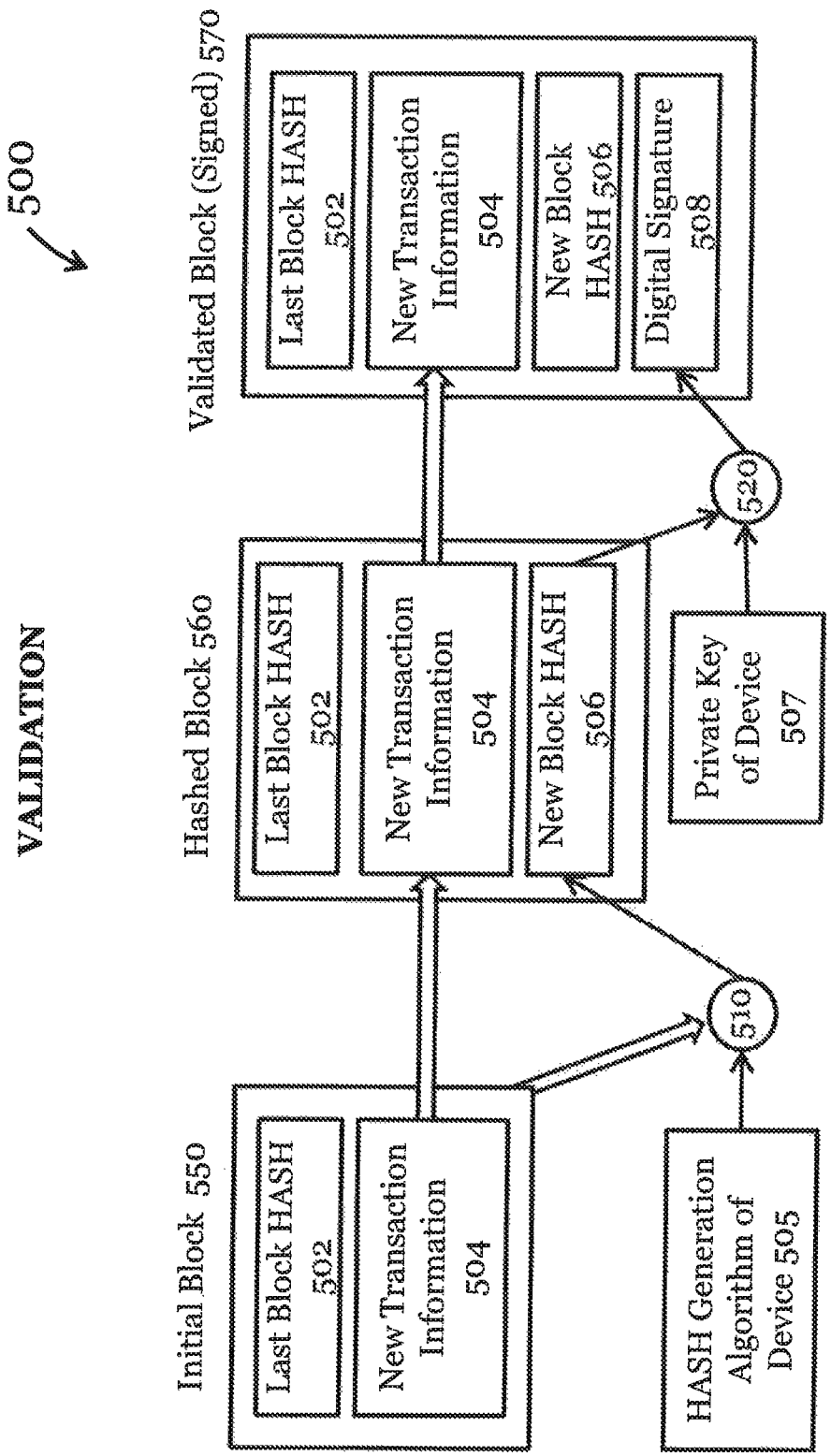
FIG. 5 is a schematic diagram illustrating a validation process in the method of FIG. 4 in one embodiment of the invention.

FIG. 5 shows a general validation process 500 in one embodiment of the invention for validating a new block. The validation process 500 is simplified for illustrating, basically, how a validated block can be obtained. It should be noted that in some embodiments of the method of the invention the validated block could include multiple digital signatures.

At the beginning of the process 500, one of the information handling devices in the blockchain network has initiated a new transaction request. Then, one or more (e.g., a selected number or all) information handling devices in the blockchain network, which may (or may not) include the device that initiates the new transaction request, uses the data 504 of the new transaction request and the last HASH value 502 in the blockchain ledger to generate a new HASH value 506. More specifically, in step 510, the information handling device(s) use the data 504 of the new transaction request and the last HASH value 502 in the blockchain ledger as input data, and applies its corresponding HASH generation algorithm to the input data, to form an interim hashed block 560 with a new HASH value 506 appended to the initial block 550. Then, the interim hashed block 560 is digitally signed by one of the information handling devices in the blockchain network. The information handling device that digitally signs the interim hashed block 560 can be but need not be the same information handling device that generates the new HASH value 506. Specifically, in step 520, the new HASH value 506 in the interim hashed block 560 is used an input data and a corresponding private key 507 of the information handling device arranged to perform signing is applied to the input data for generating a digital signature 508 associated with the device. The digital signature 508 can be generated using known algorithms in the art, such as Digital Signature Algorithm (DAS), Elliptic Curve DSA (ECDSA), etc. The digital signature 508 is then added to the interim hashed block 560 to form a validated block 570 that has been signed.

Figure 6:
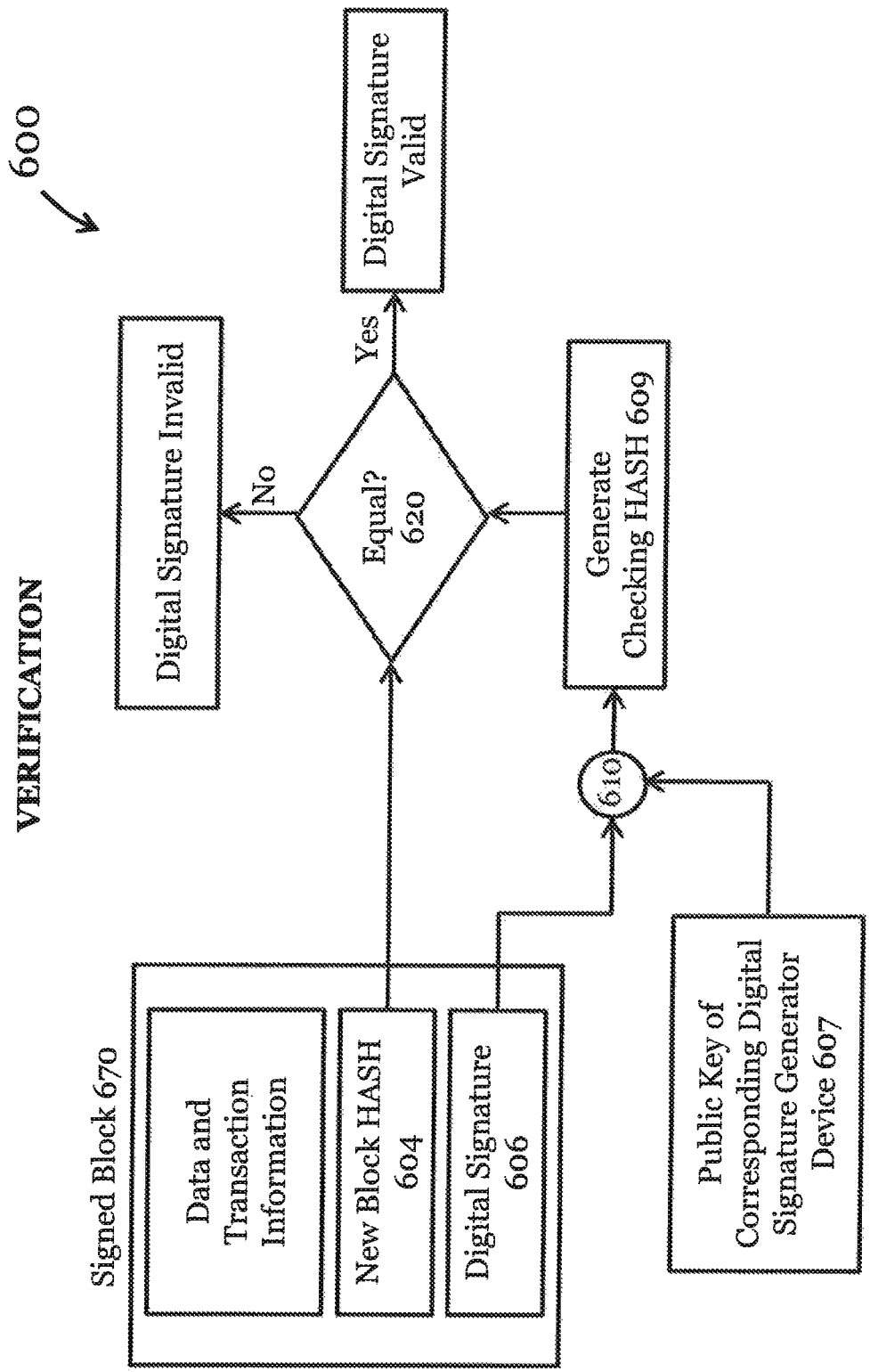
FIG. 6 is a schematic diagram illustrating a verification process in the method of FIG. 4 in one embodiment of the invention.

FIG. 6 shows a verification process 600 in one embodiment of the invention. The verification process 600 is for determining whether the blockchain ledger to be updated includes a block associated with the new transaction request. Preferably, this verification process 600 is performed by an information handling device in the blockchain network that did not sign or did not generate the signed block. The verification process 600 is simplified for illustrating, basically, how a validated block can be verified by an information handling device in the blockchain network. The signed block 670 illustrated in FIG. 6 has only one digital signature but in other embodiments the block may include multiple signatures each separately verifiable using the process 600 described.

Referring now to FIG. 6, the verification of individual digital signature 606 in a validated or signed block 670 includes, in step 610, generation of a checking HASH value 609 using the digital signature 606 and the public key 607 of the information handling device that signed the block 670. Then in step 620, the checking HASH value 609 is compared with the latest HASH value 604 in the signed block 670 for determining whether the digital signature 606 is valid. If the checking HASH value 609 is determined to match the latest HASH value 604 (e.g., they are identical), then the digital signature 606 is considered valid. Otherwise, the digital signature 606 is considered invalid and the verification fails. In some embodiments when the digital signature 606 is considered invalid, exception handling process will be executed.

It should be noted that complete verification in a blockchain network requires the process 600 to be performed at multiple (or all) of the information handling devices in the blockchain network. The overall verification can be performed with one of the following algorithms:

(1) Proof of work (PoW): the blockchain system selects a set of first predetermined number of verified new transaction blocks (two or more blocks) for generation of the new transaction block to be appended to the ledger, (2) Proof of stake (PoS): the blockchain system selects a predetermined number of information handling devices (at least two devices) to perform verification for generation of the new transaction block to be appended to the ledger, (3) Proof of assignment (PoA): the blockchain system assigns the validating task to a predetermined number of information handling devices (at least two) or even predetermined (selected) information handling devices to perform verification for generation of the new transaction block to be appended to the ledger. In one embodiment, the number of information handling devices used, or the information handling devices selected, can be based on the characteristics (e.g., value, importance, timing, etc.) of the new transaction.

In some embodiments employing PoS and PoA, the number of verified new transaction blocks are predetermined and so the blocks can be consolidated (combined) before verification.

The overall verification of the system can be considered to be successful (i.e., successfully verified) when more than half of the information handling devices that perform the verification have determined that two or more digital signatures are valid. Alternatively, overall verification of the system can be considered to be successful (i.e., successfully verified) when a predetermined number of information handling devices that perform the verification have determined that two or more digital signatures are valid.

Figure 7:
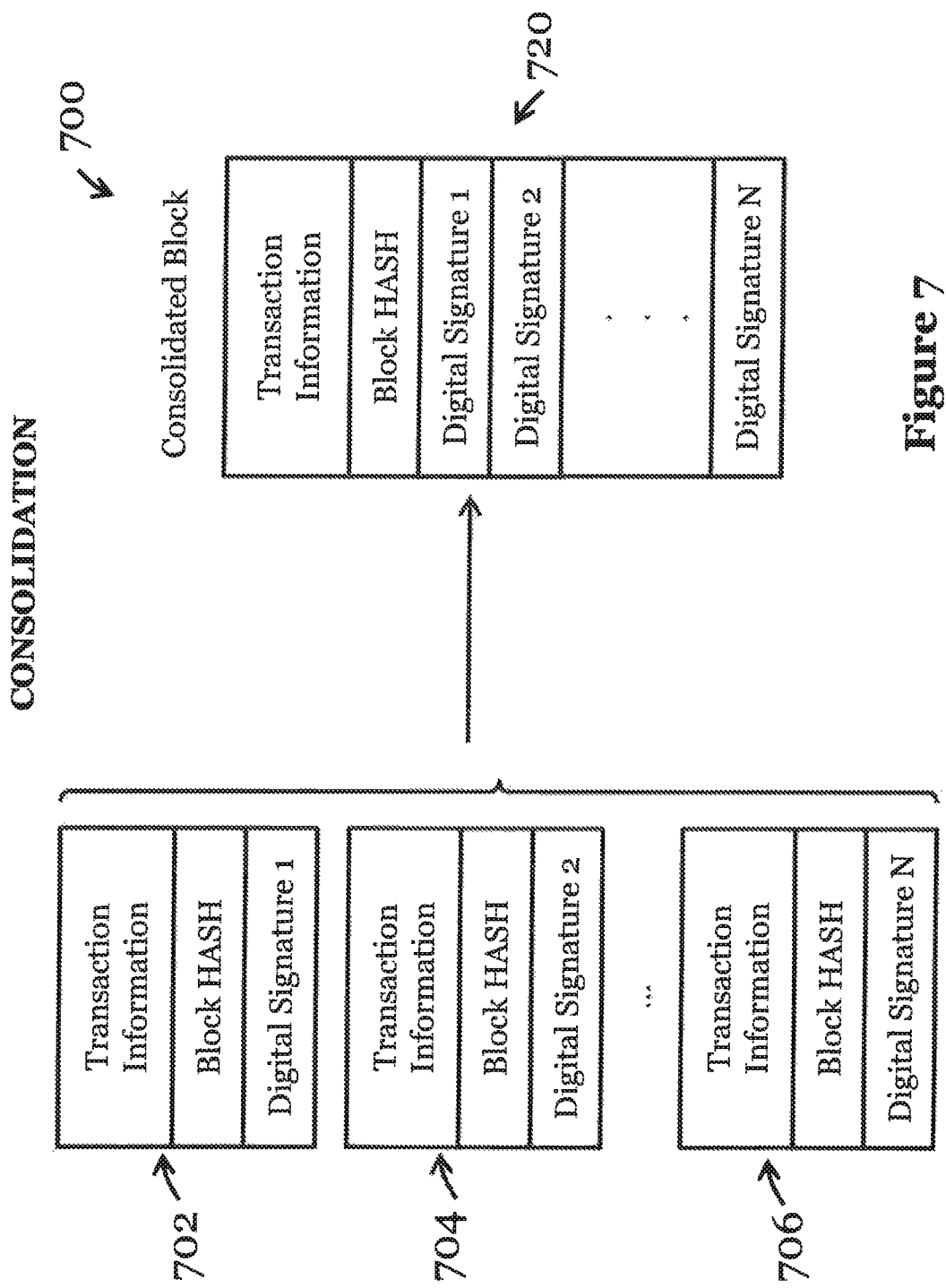
FIG. 7 is a schematic diagram illustrating an explicit consolidation process in the method of FIG. 4 in one embodiment of the invention.

FIG. 7 shows an explicit consolidation process 700 in one embodiment of the invention. As shown in FIG. 7, multiple interim blocks 702, 704, 706 are combined into a consolidated block 720. The interim blocks 702, 704, 706 are either blocks that have been validated (w.r.t. the new transaction request), or blocks that have been both validated and verified (w.r.t. the new transaction request). In this process 700, the common data between the interim blocks 702, 704, 706 are consolidated into the consolidated block 720 without redundancy. The resulting consolidated block includes multiple digital signatures and has a block structure similar to that in FIG. 3. The consolidation process 700 can be performed at one, more than one, or all of the information handling devices of the blockchain network.

Figure 8:
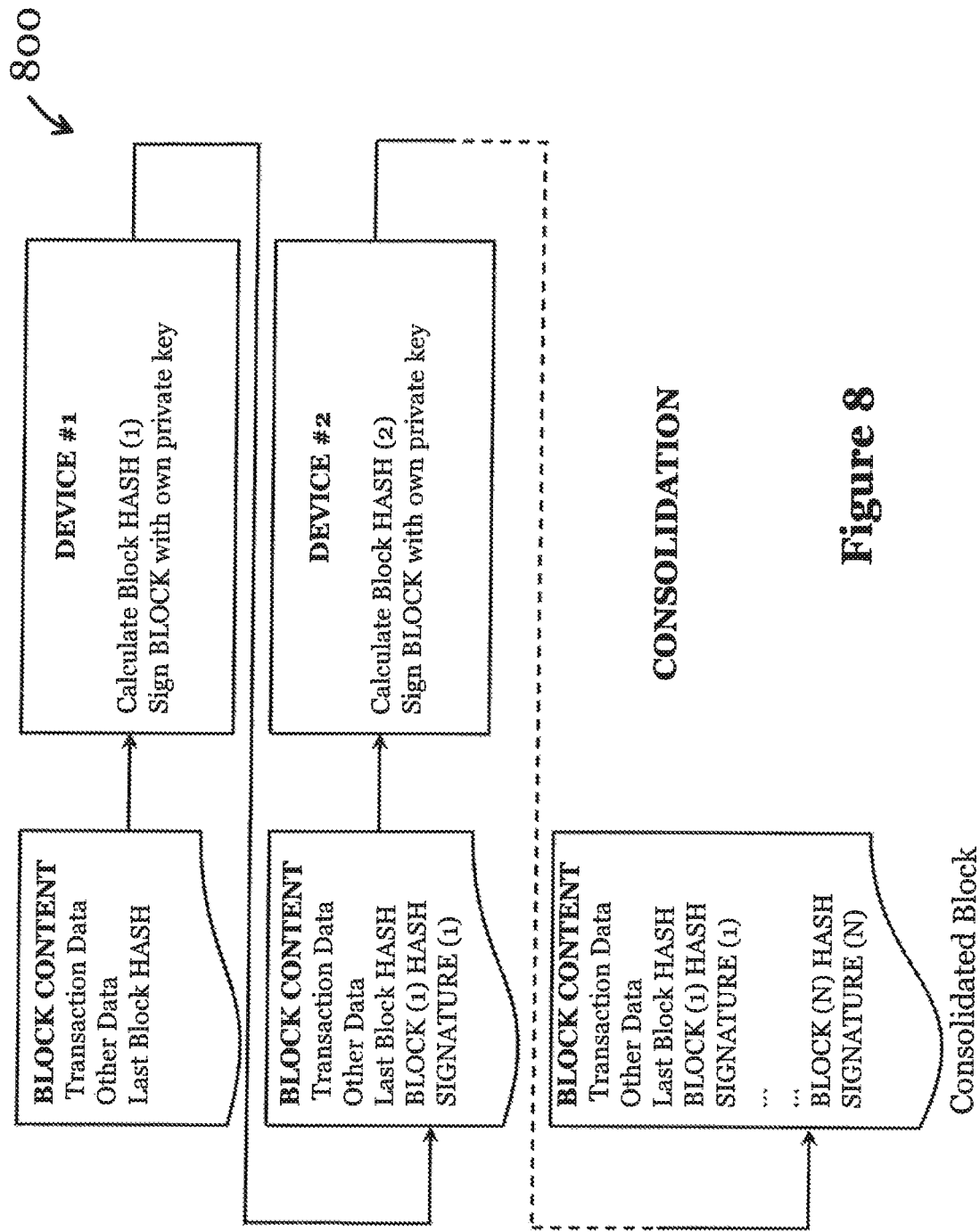
FIG. 8 is a schematic diagram illustrating an implicit consolidation process in the method of FIG. 4 in one embodiment of the invention.

FIG. 8 shows an implicit consolidation process 800 in one embodiment of the invention. As shown in FIG. 8, the process 800 involves one device signing a first interim block associated with the new transaction request, then another device signing a second interim block resulting from the signing of the first interim block by the first device, then a further device signing, etc. This serial or series signing process can be performed with any number of two or more information handling devices in the blockchain network, and it can be embodied as part of the validation process 500 in FIG. 5 (hence the name "implicit" consolidation). The final interim block would include multiple signatures and additional HASH values in between different digital signatures. The final interim block would still be similar to the block illustrated in FIG. 3 in that it includes multiple digital signatures from multiple information handling devices in the blockchain network. Alternatively, the first block HASH may be used as input data for generation of the second or subsequent digital signatures.

Figure 9:
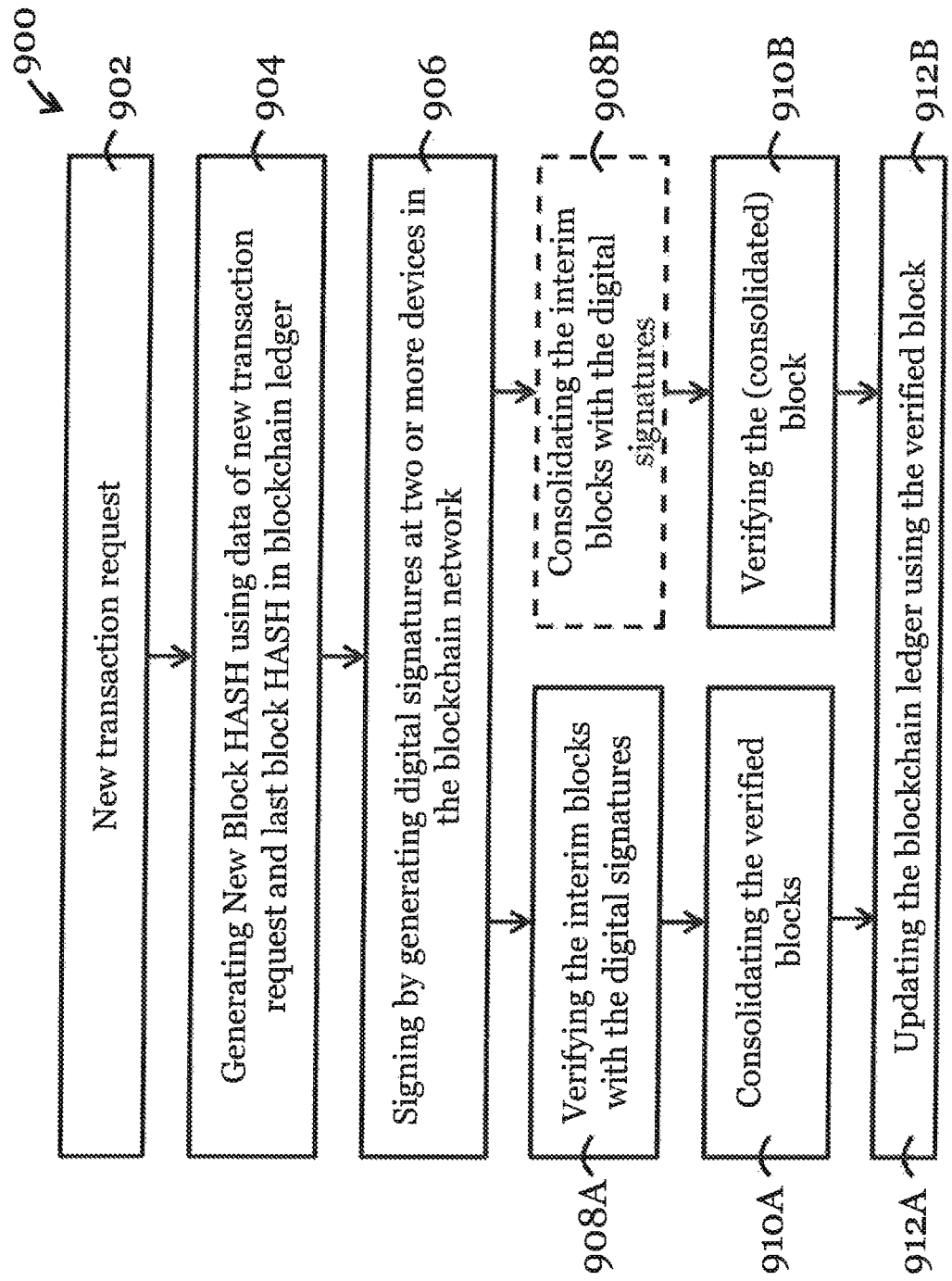
FIG. 9 is a flow diagram of a method for securing transaction in blockchain network in one embodiment of the invention.

FIG. 9 illustrates a method 900 for securing transaction in blockchain network in one embodiment of the invention. The method 900 in FIG. 9 illustrates, in greater detail, the high-level process in the method 400 of FIG. 4. As shown in FIG. 9, the method 900 begins in step 902, with one of the information handling device in the blockchain network initiating a new transaction request. Then, in step 904, one or more of the information handling devices in the blockchain network takes the data of the new transaction request and the last HASH value in the blockchain ledger to generate an interim hashed block with a new HASH value, using respective HASH generating. algorithms in the respective information handling device. Subsequently, in step 906, one or more of the information handling devices (may or may not be the device that generates the interim hashed block) in the blockchain network sign the interim hashed block or an associated block. In step 906, the signing can be in parallel, in which different devices sign blocks with the same HASH value using their respective signatures to generate multiple interim blocks with same content but different signatures. Alternatively, in step 906, the signing can be in series in which one device signs after the other. In this case, the blocks signed by the different devices are not identical, and the resulting interim block will include the HASH values and signatures of all previous signing devices, like as described in FIG. 8.

In one embodiment of parallel signing, after the signing, the method 900 proceeds to step 908A, in which all signed interim blocks are verified by information handling devices in the blockchain network. The verification can be performed by some or all of the information handling devices in the blockchain network. Upon successful verification in step 908A, the method proceeds to step 910A, in which multiple interim verified and signed blocks are consolidated into a single block without redundant data and with multiple digital signatures. After the consolidated block is obtained, in step 912A, the blockchain ledger is updated using the consolidated block. This update would involve updating all blockchain ledgers in all information handling devices in the blockchain network.

In an alternative embodiment, after the signing, the method 900 proceeds to step 908B, in which all signed interim blocks are first consolidated into a single block before verification. The consolidation may involve combining all signed blocks into a single block without redundant data and with multiple digital signatures. In embodiments of series signing, the consolidation is implicitly performed as part of the signing process in step 906. In any case, after consolidation, the method then proceeds to step 910B, in which the consolidated block is verified by the information handling devices in the blockchain network. Upon successful verification, in step 912B, the blockchain ledger is updated using the verified block. This update would involve updating all blockchain ledgers in all information handling devices in the blockchain network.

Figure 10:
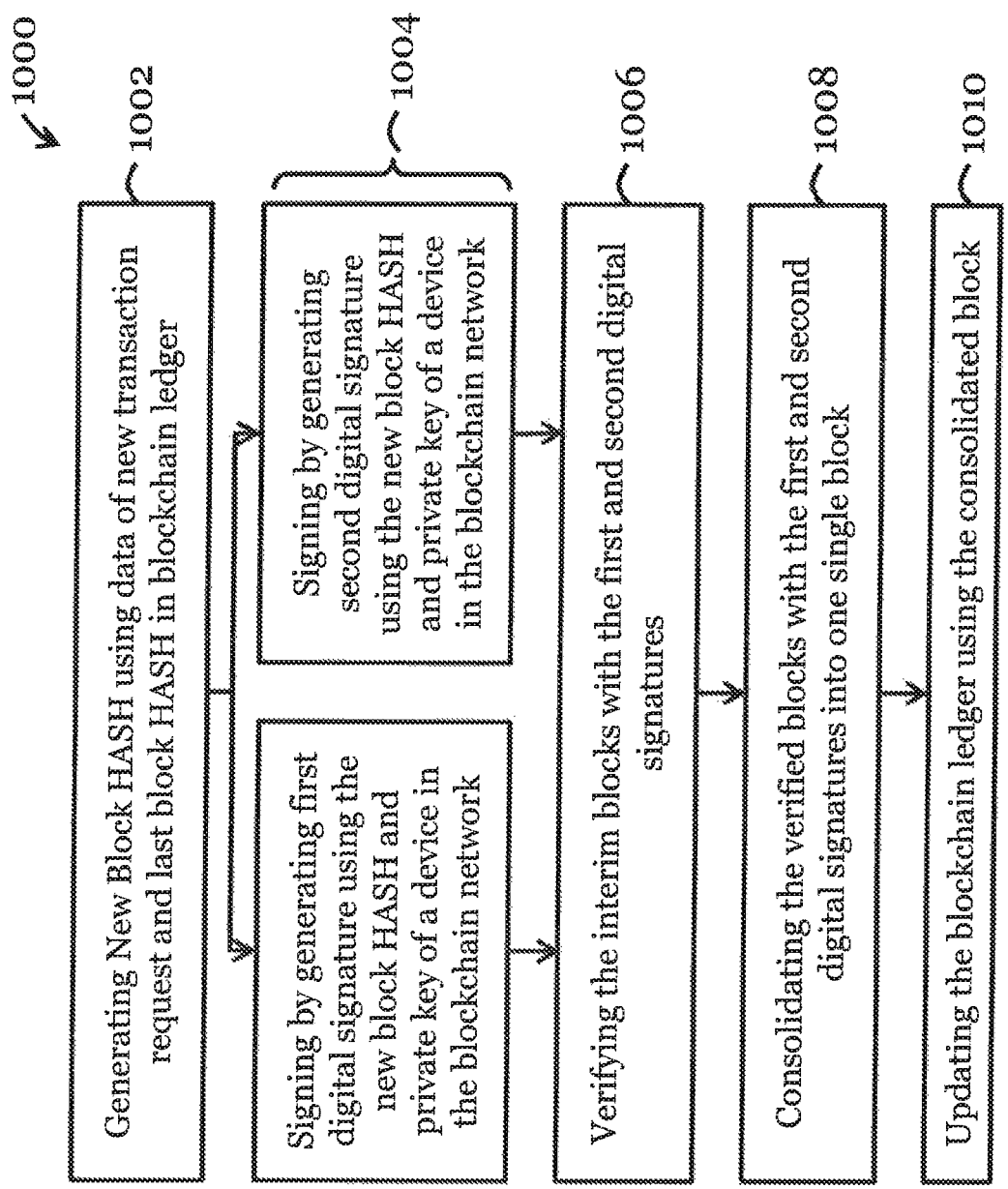
FIG. 10 is a flow diagram of one implementation of the method in FIG. 9 using parallel signing in one embodiment of the invention.

FIG. 10 is an implementation of the method 900 in FIG. 9 using parallel signing in one embodiment of the invention. In this implementation, the method 1000 involves parallel signing of two digital signatures by two devices in the blockchain network. It should be noted that the method 1000 can be applied to parallel signing of any number of multiple information handling devices in the blockchain network.

As shown in FIG. 10, the method 1000 includes, in step 1002, generation of a new HASH value using data of the new transaction request and latest HASH value in the blockchain ledger. Then in step 1004, two information handling devices respectively sign a hashed block with their own digital signature, e.g., similar to the method of FIG. 5 and related description. In step 1006, the signed hashed blocks are distributed in the blockchain network for verification. Specifically, each of the information handling devices or selected information handling devices in the blockchain network are arranged to verify the two signatures, e.g., in a similar manner as FIG. 6 and related description. When more than half of the information handling devices or selected information handling devices has successfully verified the two digital signatures, the verification is considered to be successful, and the method proceeds to step 1008, in which the two blocks of verified signed blocks are consolidated into one, e.g., in a similar manner as FIG. 7 and related description. Finally, the consolidated block is added to the existing blockchain ledger to update the blockchain ledger in all information handling devices in the blockchain network.

Figure 11:
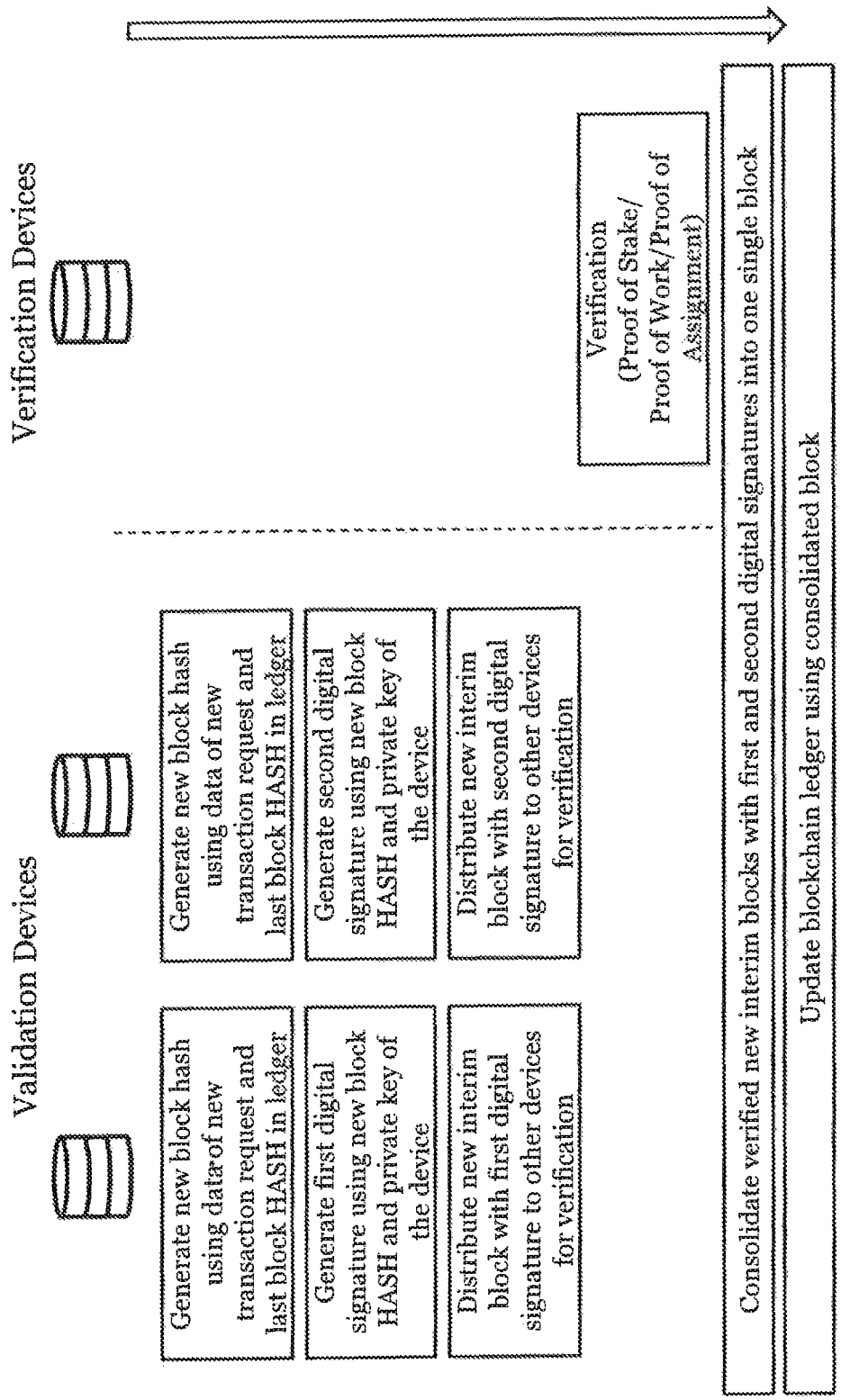
FIG. 11 is a schematic diagram illustrating an implementation of the method of FIG. 10.

FIG. 11 is one specific implementation of the method 1000 in FIG. 10. In FIG. 11, the two validation devices (information handling device that performs part or all of the validation function) each generates a new HASH value and signs the hashed block, as in steps 1002 and 1004. Then, the two validation devices distribute the new blocks to the verification devices (other information handling devices in the blockchain network that perform the verification). Optionally, one validation device may distribute its signed interim block to the other validation device to perform verification. Verification is then performed, as in step 1006, using verification method described with respect to FIG. 6. Upon successful verification, the verified blocks are consolidated into one single block, as in step 1008, then appended to the blockchain ledger as in step 1010, such that the blockchain ledger now includes data of the new transaction.

Figure 12:
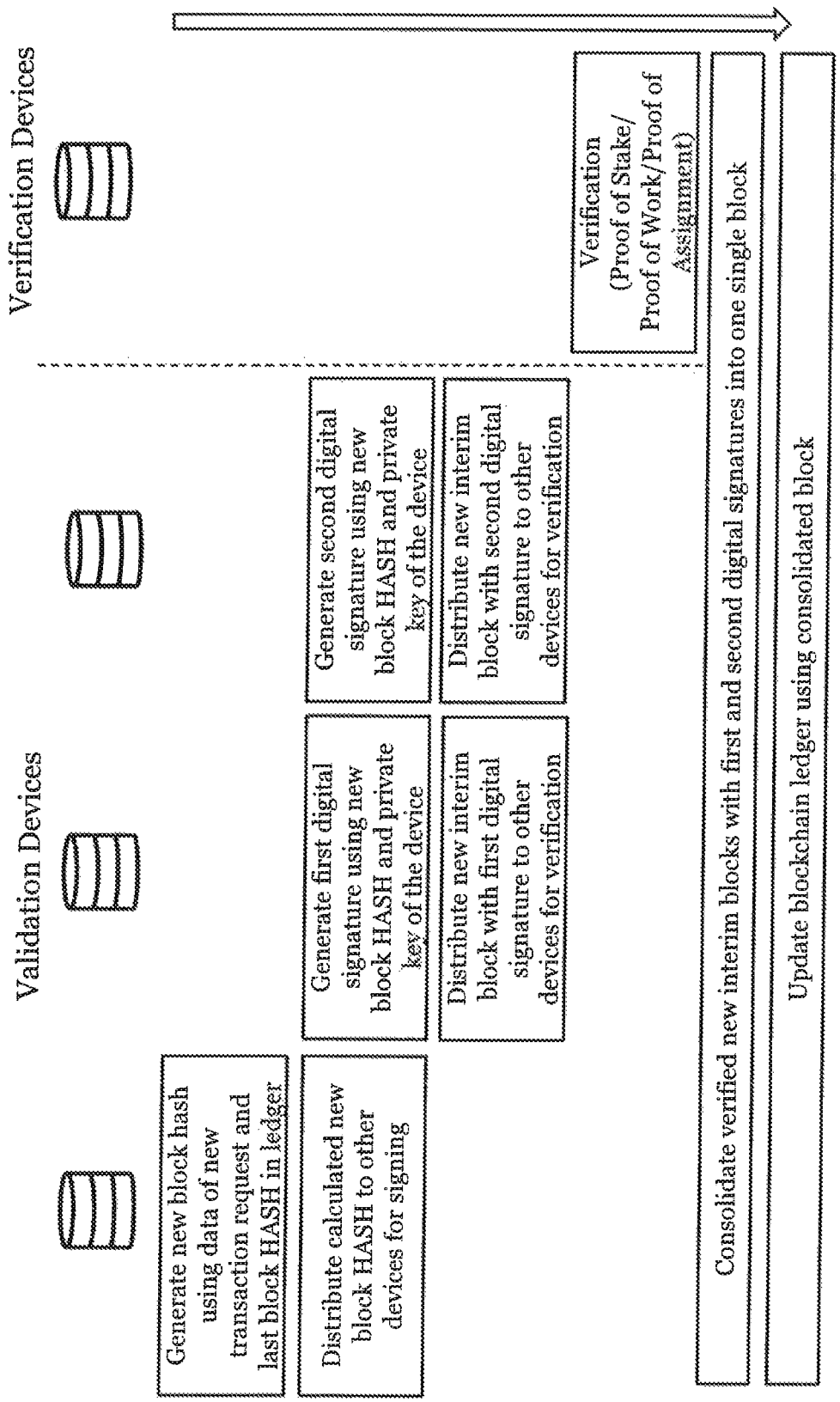
FIG. 12 is a schematic diagram illustrating another implementation of the method of FIG. 10.

FIG. 12 is another specific implementation of the method 1000 in FIG. 10. The implementation of FIG. 12 is identical to that of FIG. 11, except that the generation of new HASH value in step 1002 and the signing in step 1004 are performed by different validation devices.

Figure 13:
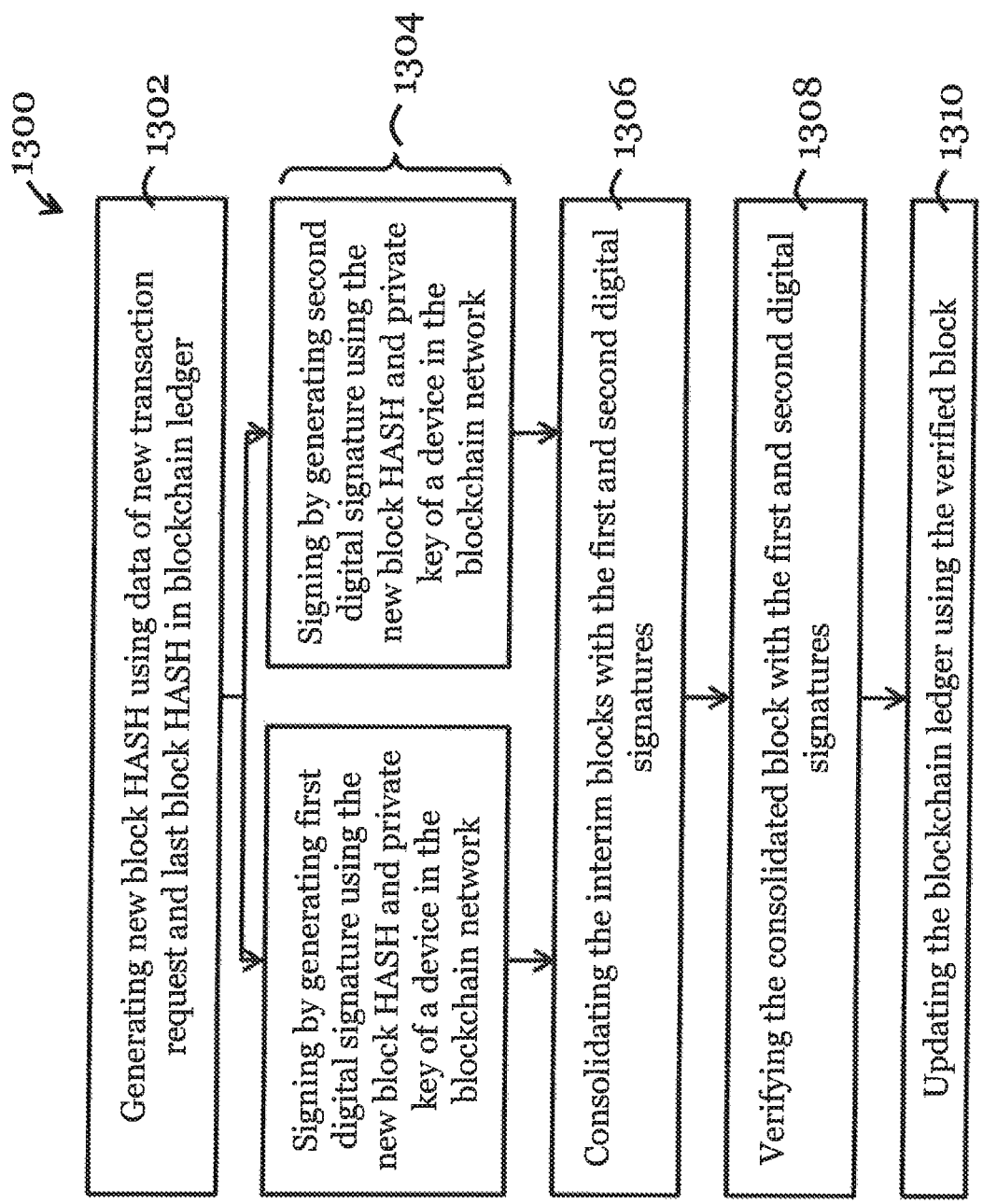
FIG. 13 is a flow diagram of one implementation of the method in FIG. 9 using parallel signing in one embodiment of the invention.

FIG. 13 is an implementation of the method 900 in FIG. 9 using parallel signing in another embodiment of the invention. In this implementation, the method 1300 involves parallel signing of two digital signatures by two devices in the blockchain network. It should be noted that the methods can be applied to parallel signing of any number of multiple information handling devices in the blockchain network.

The method 1300 in FIG. 13 is similar to the method 1000 in FIG. 10, except that the order of consolidation and validation steps is changed. As shown in FIG. 13, the method 1300 includes, in step 1302, generation of a new HASH value using data of the new transaction request and latest HASH value in the blockchain ledger. Then in step 1304, two information handling devices respectively sign a hashed block with their own digital signature, e.g., similar to the method of FIG. 5 and related description. In step 1306, the signed hashed blocks are first consolidated into a single signed block with multiple digital signatures, e.g., in a similar manner as FIG. 7 and related description. The consolidation may be performed by one device in the network then distributed to other devices, or it may be performed independently by different deices in the network. The consolidated interim block with multiple digital signatures is then distributed in the blockchain network for verification in step 1308. Specifically, each of the information handling devices or selected information handling devices in the blockchain network are arranged to verify the two signatures, e.g., in a similar manner as FIG. 6 and related description. When more than half of the information handling devices or selected information handling devices have successfully verified the two digital signatures, the verification is considered to be successful. Finally, the verified consolidated block is added to the existing blockchain ledger in step 1310 to update the blockchain ledger in all information handling devices in the blockchain network.

Figure 14:
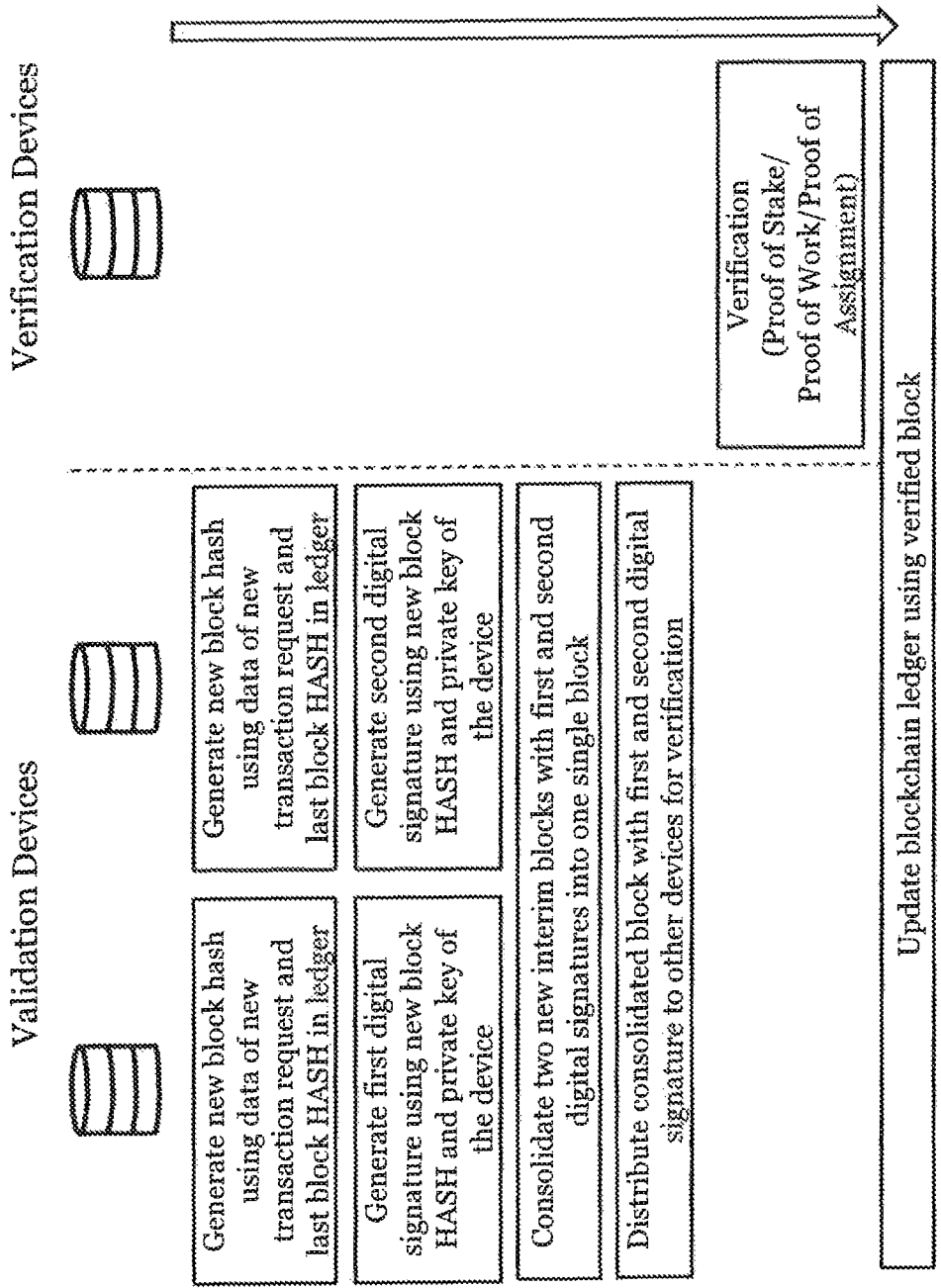
FIG. 14 is a schematic diagram illustrating an implementation of the method of FIG. 13.

FIG. 14 is one specific implementation of the method 1300 in FIG. 13. In FIG. 13, the two validation devices (information handling device that performs part or all of the validation function) each generates a new HASH value and signs the hashed block, as in steps 1302 and 1304. Then, one or both of the two validation devices distribute the respective new block to the other to consolidate the two interim blocks into a single block with the two signatures, as in step 1306. The validation device(s) then distribute the consolidated block to the verification devices (other information handling devices in the blockchain network that perform the verification) for verification. Verification is then performed, as in step 1308, using verification method described with respect to FIG. 6. Upon successful verification, in step 1310, the verified block is then appended to the blockchain ledger such that the blockchain ledger now includes data of the new transaction.

Figure 15:
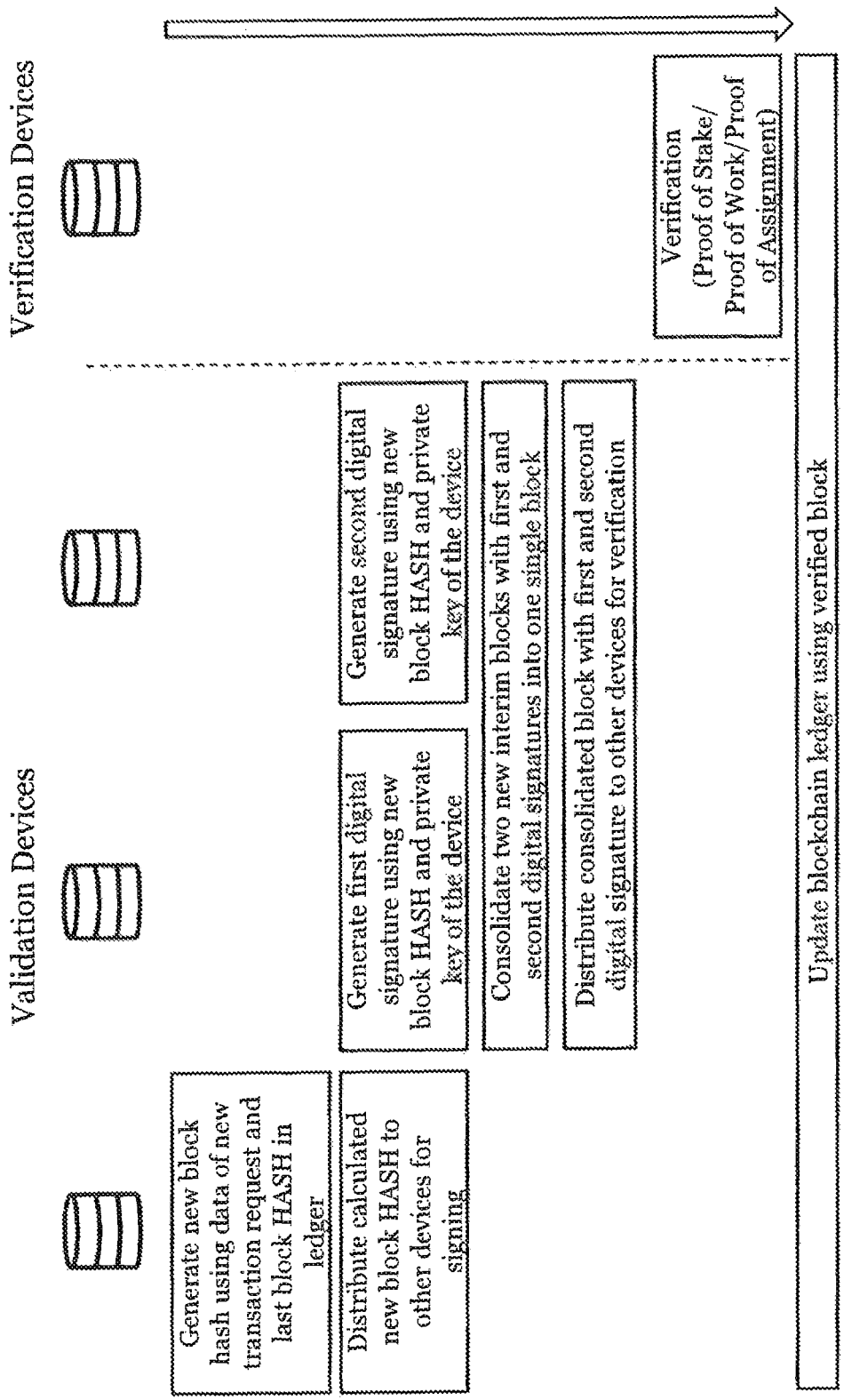
FIG. 15 is a schematic diagram illustrating another implementation of the method of FIG. 13.

FIG. 15 is another specific implementation of the method 1300 in FIG. 13. The implementation of FIG. 15 is identical to that of FIG. 14, except that the generation of new HASH value in step 1302 and the signing in step 1304 are performed by different validation devices.

Figure 16:
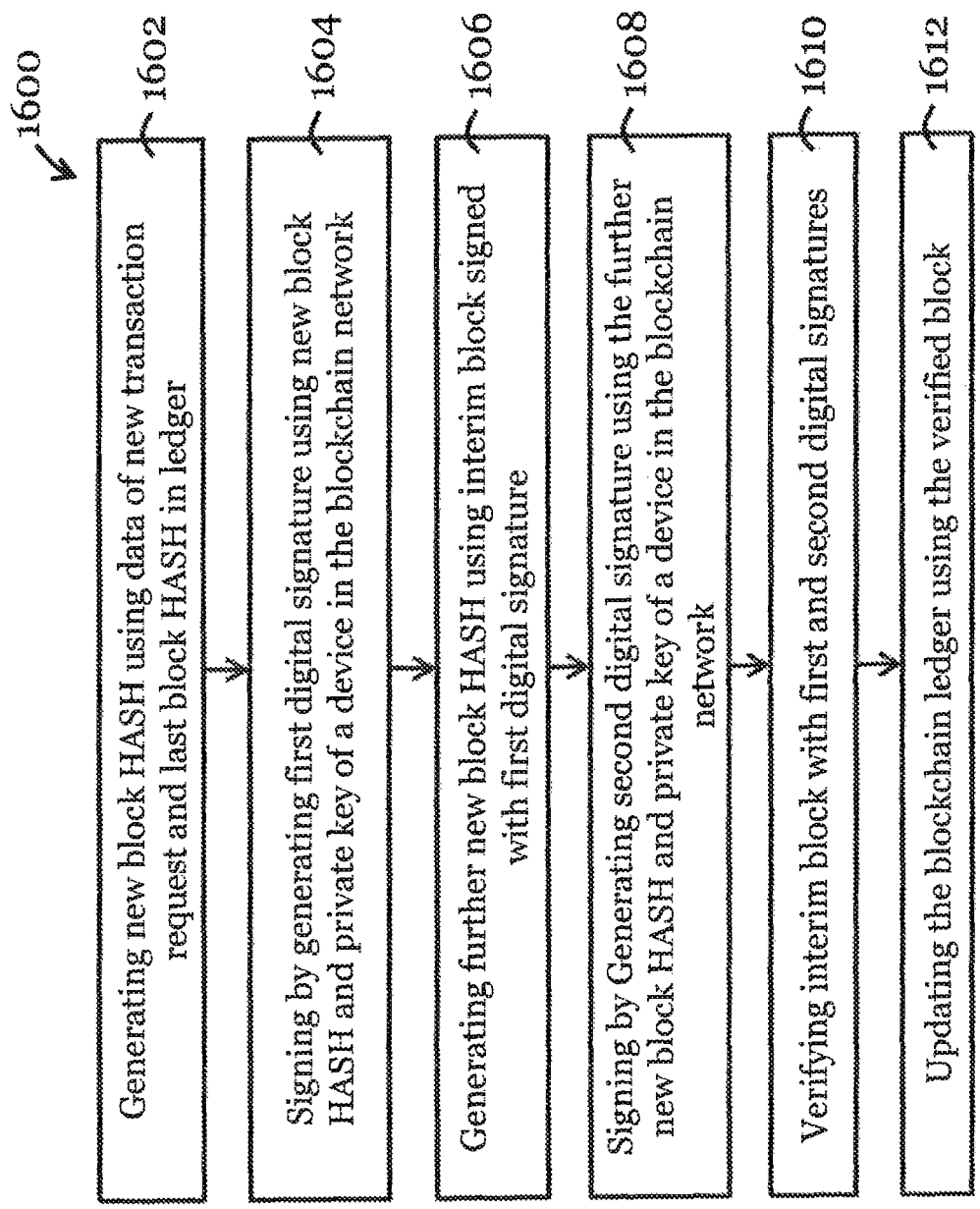
FIG. 16 is a flow diagram of one implementation of the method in FIG. 9 using serial signing in one embodiment of the invention.

FIG. 16 is an implementation of the method 900 in FIG. 9 using series or serial signing in one embodiment of the invention. In this implementation, the method 1600 involves serial signing of two digital signatures by two devices in the blockchain network. It should be noted that this method can be applied to serial signing of any number of multiple information handling devices in the blockchain network.

As shown in FIG. 16, the method 1600 includes, in step 1602, generation of a new HASH value using data of the new transaction request and latest HASH value in the blockchain ledger. Then in step 1604, a first information handling device signs a hashed block with its own digital signature, e.g., similar to the method of FIG. 5 and related description. This signed interim block is then transmitted to a second information handling device in the network. In step 1606, the second information handling device generates a further HASH value using the interim block signed with the first signature. In step 1608, the second information handling device signs the new hashed block with its own digital signature, e.g., similar to the method of FIG. 5 and related description, to creates a single block with both the first and second signatures. In this way, the first and second signatures are implicitly consolidated in the single block. The single block with both the first and second signatures is then distributed in the blockchain network for verification in step 1610. Specifically, in step 1610, each of the information handling devices or selected information handling devices in the blockchain network are arranged to verify the two signatures, e.g., in a similar manner as FIG. 6 and related description. When more than half of the information handling devices or selected information handling devices have successfully verified the two digital signatures, the verification is considered to be successful, and the method proceeds to step 1612, in which the verified block is added to the existing blockchain ledger to update the blockchain ledger in all information handling devices in the blockchain network. Optionally, generation of the second and further HASH can be eliminated by always using the first generated block HASH as generating information for further digital signatures.

Figure 17:
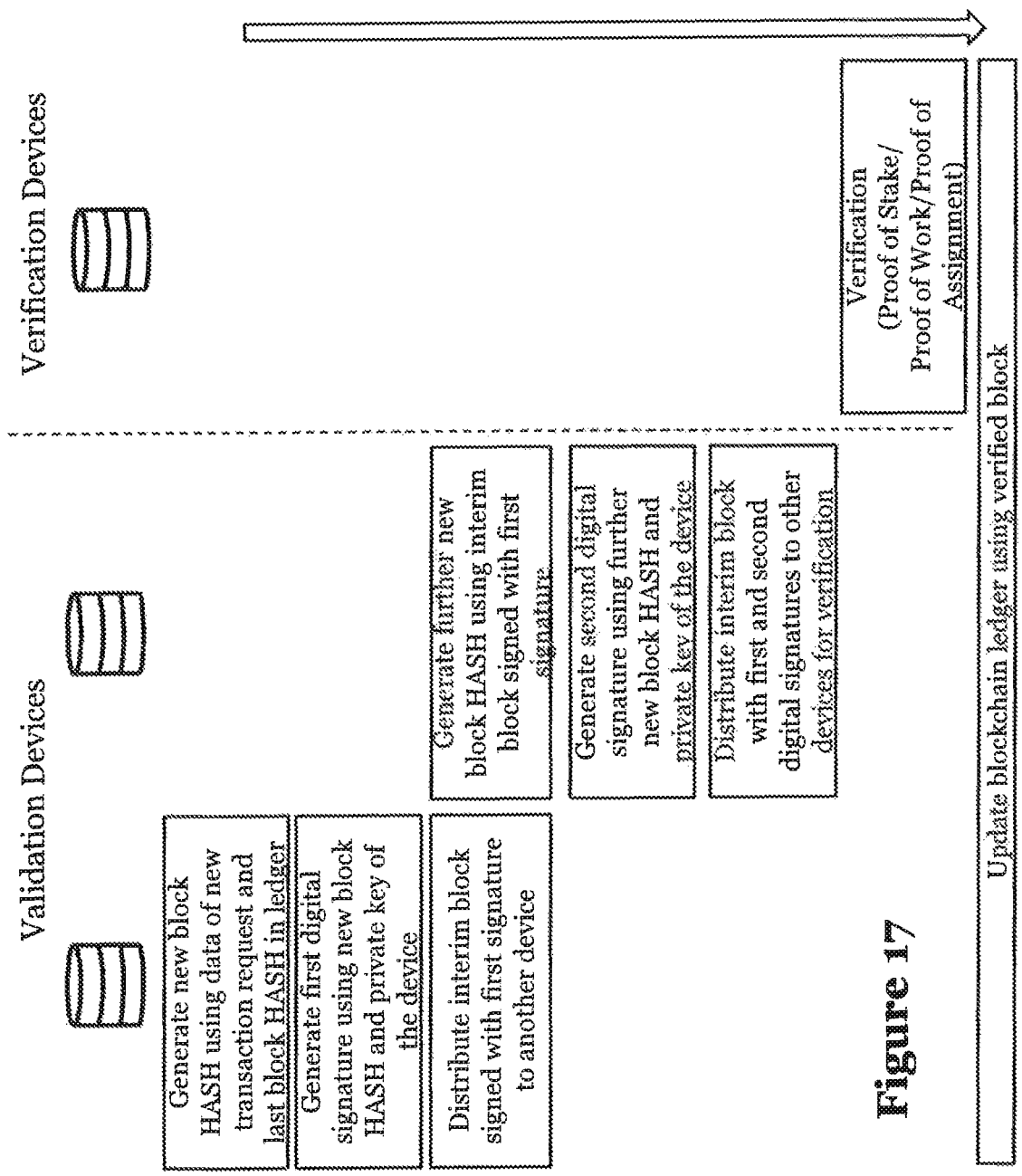
FIG. 17 is a schematic diagram illustrating another implementation of the method of FIG. 16.

FIG. 17 is one specific implementation of the method 1600 in FIG. 16. In FIG. 17, the first validation device (information handling device that performs part or all of the validation function) generates a new HASH value and signs the hashed block, as in steps 1602 and 1604. Then, the first validation device distributes the interim signed block to the second validation device. The second validation device generates a new HASH value and signs the hashed block, as in steps 1606 and 1608. Afterwards, the single signed block with both signatures is distributed to the verification devices in the network for verification, as in step 1610. Upon successful verification, in step 1612, the verified block is then appended to the blockchain ledger such that the blockchain ledger now includes data of the new transaction.

Figure 18:
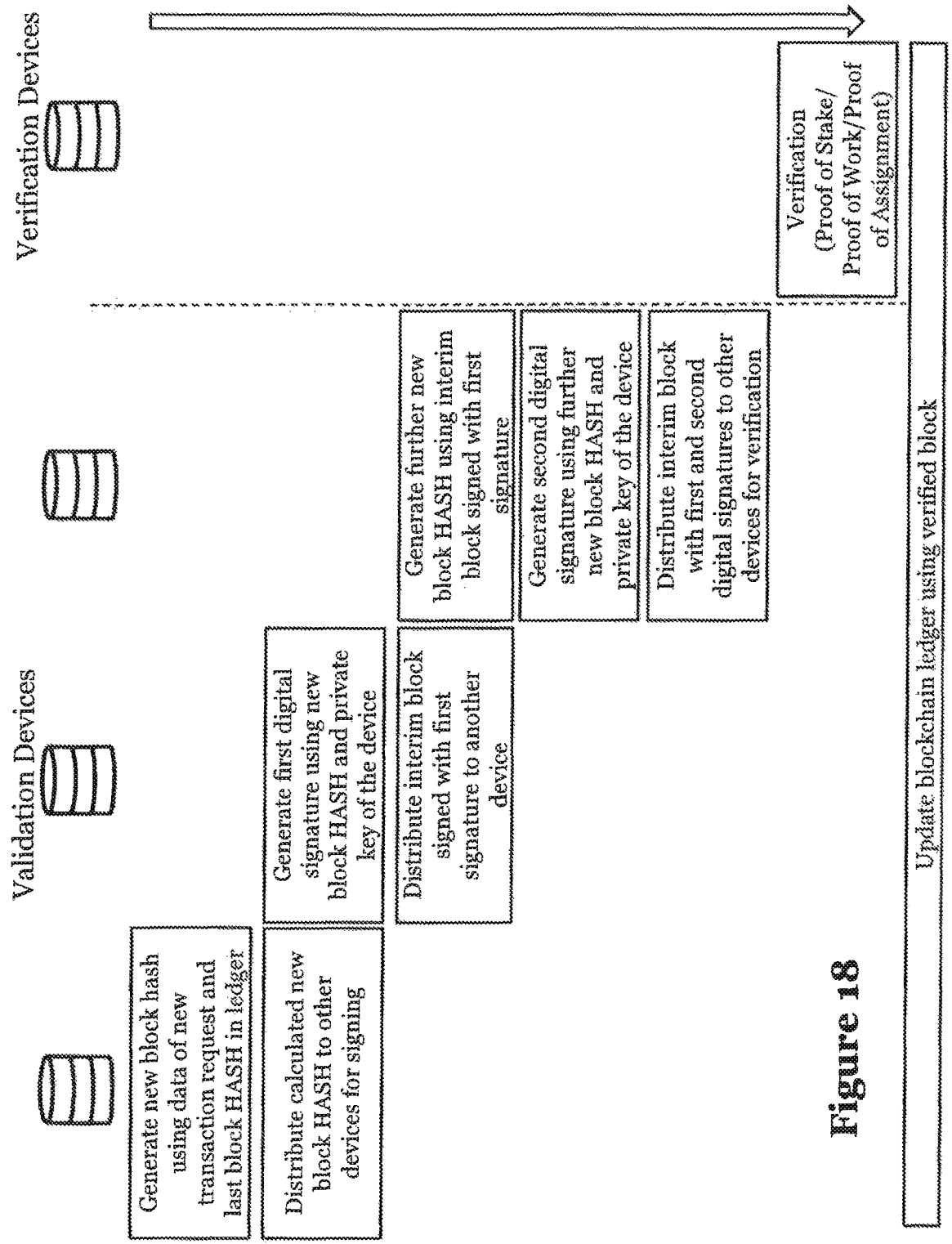
FIG. 18 is a schematic diagram illustrating another implementation of the method of FIG. 16.

FIG. 18 is another specific implementation of the method 1600 in FIG. 16. The implementation of FIG. 18 is identical to that of FIG. 17, except that the generation of new HASH value in step 1602 and the signing in step 1604 are performed by different validation devices.

The system and method embodiments of the invention as described above are particular advantageous for securing transaction in a blockchain network, and more particularly, for preventing hostile takeover of the blockchain network or tampering of the blockchain ledger. In the invention, the information handling devices in the blockchain network that are arranged to generate the new HASH value and the digital signatures are not known to attackers until actual processing of the new transaction request to generate a new block to be appended to the blockchain ledger. The inclusion of multiple digital signatures substantially increases the difficulty in tampering of the new block because the attack would have to be performed simultaneously at multiple information handling devices within the limited time interval of processing of the new block or the new transaction request. Various other advantages in the underlying security of the blockchain systems and methods will become apparent to the skilled person upon reading the description and referring to the illustrated drawings. Embodiments of the invention are of practical importance and are closely related to computer technologies, more specifically to security of computer technologies.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

The expressions "validation device", "generation device", "signing device", "verification device", "consolidation device", or the like in the above description and in the Figures are used to refer to the function that an information handling device in the blockchain network of the invention can perform. It should be noted that any information handling device in the blockchain network of the invention can function as one or more of these devices. In other words, as an example, the same information handling device can be called a "validation device" and a "verification device" at different times, depending on the action the device is performing at the respective instance. The "public key" and "private key" are known terms in the art of blockchain. Their generation and use in some embodiments of the invention are the same as in conventional blockchain. References to validation, verification, and consolidation in FIGS. 9 to 18 can refer to the respective processes illustrated and described with respect to FIGS. 5 to 8.

It will be appreciated by persons skilled in the art that numerous variations and/or modifications may be made to the invention as shown in the specific embodiments without departing from the spirit or scope of the invention as broadly described. One or more features in any system and method embodiments described and illustrated in the drawings can be combined with one or more other features in any system and method embodiments described and illustrated in the drawings to form new embodiments. For example, the parallel and serial signing validation schemes can be combined to form a single validation scheme that involves both parallel and serial signing. The described embodiments of the invention should be considered in all respects as illustrative, not restrictive.

For example, the blockchain network 10 in FIG. 1 can be a private blockchain network or a public blockchain network. The blockchain network of the invention need not include six information handling devices as in network 10, but can include any number of three or more information handling devices. In some embodiments, the blockchain network of the invention can be expanded by including additional information handling devices. In some embodiments, one or more of the information handling devices in the blockchain network can be a management device that manages inclusion or exclusion of information handling devices in the blockchain network. The order of the data 302, the HASH value 304, and the signatures $306_1$-$306_N$ in the block structure 300 in FIG. 3 can be different so long as they are present in the block. Likewise, the order of the block contents in FIGS. 5 to 8 can have a different order without affecting the implementation of the invention.

The invention claimed is:

1. A method for securing a transaction in a blockchain network, the blockchain network including a plurality of information handling devices operably connected with each other, the plurality of information handling devices collectively maintaining a blockchain ledger containing one or more transaction blocks with transaction information, the method comprising:
    validating a new transaction request to be added to the blockchain ledger, validation including digitally signing, with digital signatures, at two or more of the information handling devices in the blockchain network, respectively, an interim block associated with the new transaction request using a HASH value of the interim block and respective private keys of the two or more of the information handling devices; and
    verifying the one or more interim blocks that have been digitally signed for determining, whether to add to the blockchain ledger a new transaction block containing the new transaction request that has been validated and the digital signatures.

2. The method of claim 1, further comprising adding, to the blockchain ledger in each of the plurality of information handling devices, the new transaction block containing the new transaction request that has been validated and the digital signatures upon successful verification of the one or more interim blocks that have been signed.

3. The method of claim 1, wherein the validating further comprises, prior to signing: generating, at one or more of the information handling devices in the blockchain network, an interim block with a HASH value, using a hashing algorithm as directed by a blockchain system provided by the blockchain network, and based on data of the new transaction request and the last HASH value in the blockchain ledger.

4. The method of claim 3, wherein the one or more information handling devices that generate the interim block with the HASH value are further arranged to digitally sign the interim block.

5. The method of claim 3, wherein the one or more information handling devices that generate the interim block with the HASH value are arranged to transmit the interim block to other information handling devices in the blockchain network for digital signing.

6. The method of claim 1, wherein the two or more of the information handling devices that perform the digital signing include a first information handling device and a second information handling device, and wherein digital signing at the two or more of the information handling devices is performed at least partly in parallel such that the digital signing comprises;
    generating, at the first information handling device, from the interim block associated with the new transaction request, a first signed interim block with a digital signature of the first information handling device; and
    generating, at the second information handling device, from the interim block associated with the new transaction request, a second signed interim block with a digital signature of the second information handling device.

7. The method of claim 6, further comprising consolidating the first and second signed interim blocks to form a single signed block with all of the respective digital signatures.

8. The method of claim 7, wherein the consolidating comprises:
    identifying common data present in both the first and second signed interim blocks; and
    forming the single signed block without duplicating the common data.

9. The method of claim 7, wherein the consolidating is performed prior to the verifying.

10. The method of claim 9, wherein the consolidating is performed in at least one of the information handling devices that has performed the digital signing.

11. The method of claim 7, wherein the consolidating is performed after the verifying.

12. The method of claim 1, wherein the two or more of the information handling devices in the blockchain network include a first information handling device and a second information handling device, and wherein digital signing at the two or more of the information handling devices is performed at least partly in series such that the digital signing comprises:
generating, at the first information handling device, from the interim block associated with the new transaction request, a first signed interim block with a digital signature of the first information handling device; and
generating, at the second information handling device, from the first signed interim block, a second signed interim block with a digital signature of the second information handling device.

13. The method of claim 1, wherein the verifying is performed by a predetermined number of information handling devices in the blockchain network.

14. The method of claim 1, wherein the verifying is performed by a predetermined information handling devices in the blockchain network.

15. The method of claim 1, wherein the verifying is performed by all information handling devices in the blockchain network other than the information handling devices that have performed the digital signing.

16. The method of claim 1, further comprising selecting information handling devices in the blockchain network to perform a validation or verification, and wherein the validation or verification is performed by the information handling devices in the blockchain network that are selected.

17. The method of claim 16, wherein the selecting is based on the new transaction request.

18. The method of claim 17, wherein a number of information handling devices are selected in the selecting based on a value or importance of the new transaction request.

19. The method of claim 1, wherein the verifying is successful if more than half of the information handling devices that perform the verifying have determined all of the two or more digital signatures to be valid.

20. The method of claim 1, wherein the verifying is successful if a predetermined number of the information handling devices that perform the verifying have determined all of the two or more digital signatures to be valid.

21. The method of claim 1, wherein the verifying comprises:
generating a checking HASH using a digital signature in the interim block that has been signed and a public key of the information handling device that digitally signed the corresponding digital signature;
comparing the checking HASH with a HASH value in the interim block that has been signed;
determining that the digital signature is valid if the checking HASH does not match the HASH value in the interim block that has been signed; and
determining that the digital signature is invalid if the checking HASH matches the HASH value in the interim block that has been signed.

22. A system for securing a transaction in a blockchain network, the system comprising:
a blockchain network having a plurality of information handling devices operably connected with each other and collectively maintaining a blockchain ledger containing one or more transaction blocks with transaction information wherein
each of the information handling devices of the plurality of information handling devices includes a processor,
two or more of the information handling devices are operated as signing devices arrange to digitally sign, with digital signatures, respectively, an interim block associated with the new transaction request, using a HASH value of the interim block and the respective private key of the information handling device so as to validate a new transaction request to be added to the blockchain ledger, and
one or more of the information handling devices are operated as verification devices arranged to verify the one or more interim blocks that have been signed for determining whether to add to the blockchain ledger, a new transaction block containing the new transaction request that has been verified and the digital signatures.

23. The system of claim 22, wherein the plurality of information handling devices are arranged to add, to the blockchain ledger, the new transaction block containing the new transaction request that has been validated and the digital signatures upon successful verification of the one or more signed interim blocks by the verification devices.

24. The system of claim 22, wherein one or more of the information handling devices is operated as a generation device arranged to generate, prior to signing, an interim block with a HASH value, using a hashing algorithm as directed by a blockchain system provided by the blockchain network, and based on data of the new transaction request and the last HASH value in the blockchain ledger.

25. The system of claim 24, wherein the generation device is further operated as the signing device.

26. The system of claim 24, wherein the blockchain system is arranged to transmit the interim block to the signing devices in the blockchain network for signing.

27. The system of claim 22, wherein the signing devices include a first information handling device and a second information handling device arranged to digitally sign at least partly in parallel such that:
the first information handling device is arranged to generate, from the interim block associated with the new transaction request, a first signed interim block with a digital signature of the first information handling device; and
the second information handling device is arranged to generate, from the interim block associated with the new transaction request, a second signed interim block with a digital signature of the second information handling device.

28. The system of claim 27, wherein one or more of the information handling devices is operated as a consolidation device arranged to consolidate the first and second signed interim blocks to form a single signed block with all of the respective digital signatures.

29. The system of claim 28, wherein the consolidation device is arranged to identify common data present in both the first and second signed interim block and form the single signed block without duplicating the common data.

30. The system of claim 28, wherein the consolidation device is arranged to provide the single signed block to the verification devices for verification.

31. The system of claim 30, wherein the consolidation device is further operated as the signing device.

32. The system of claim 28, wherein the consolidation device is arranged to consolidate the first and second signed interim blocks that have been verified.

33. The system of claim 22, wherein the signing devices includes a first information handling device and a second information handling device arranged to digitally sign at least partly in series such that:
the first information handling device is arranged to generate, from the interim block associated with the new transaction request, a first signed interim block with a digital signature of the first information handling device; and the second information handling device is arranged to generate, from the first signed interim block, a second signed interim block with a digital signature of the second information handling device.

\* \* \* \* \*